United States Patent
Huynh

(10) Patent No.: US 8,299,724 B2
(45) Date of Patent: Oct. 30, 2012

(54) AC LED LAMP INVOLVING AN LED STRING HAVING SEPARATELY SHORTABLE SECTIONS

(75) Inventor: Steven Huynh, Fremont, CA (US)

(73) Assignee: Active-Semi, Inc. (VG)

( * ) Notice: Subject to any disclaimer, the term of this patent is extended or adjusted under 35 U.S.C. 154(b) by 269 days.

(21) Appl. No.: 12/661,603

(22) Filed: Mar. 19, 2010

(65) Prior Publication Data

US 2011/0227485 A1   Sep. 22, 2011

(51) Int. Cl.
    *H05B 37/00* (2006.01)
(52) U.S. Cl. .......................... 315/291; 315/307; 315/308
(58) Field of Classification Search ................. 315/127, 315/205, 193, 250, 185 R, 122, 294, 291, 315/307, 308
    See application file for complete search history.

(56) References Cited

U.S. PATENT DOCUMENTS

| | | | | |
|---|---|---|---|---|
| 5,463,280 A | 10/1995 | Johnson | | 315/187 |
| 5,495,147 A | 2/1996 | Lanzisera | | 315/185 |
| 6,577,072 B2 | 6/2003 | Saito et al. | | 315/185 |
| 6,830,358 B2 | 12/2004 | Allen | | 362/640 |
| 6,972,528 B2 | 12/2005 | Shao | | 315/185 |
| 7,045,965 B2 | 5/2006 | Li et al. | | 315/185 |
| 7,138,770 B2 | 11/2006 | Uang et al. | | 315/291 |
| 7,264,381 B2 | 9/2007 | Liu et al. | | 362/364 |
| 7,276,858 B2 * | 10/2007 | Allen | | 315/205 |
| 7,344,275 B2 | 3/2008 | Allen et al. | | 362/249 |
| 7,489,086 B2 | 2/2009 | Miskin et al. | | 315/185 |
| 7,719,248 B1 * | 5/2010 | Melanson | | 323/283 |
| 2005/0243022 A1 * | 11/2005 | Negru | | 345/46 |
| 2007/0008721 A1 | 1/2007 | Peng et al. | | 362/227 |
| 2008/0094000 A1 * | 4/2008 | Yamamoto et al. | | 315/250 |
| 2010/0134018 A1 * | 6/2010 | Tziony et al. | | 315/122 |
| 2010/0308739 A1 * | 12/2010 | Shteynberg et al. | | 315/193 |

* cited by examiner

*Primary Examiner* — Jacob Y Choi
*Assistant Examiner* — Henry Luong
(74) *Attorney, Agent, or Firm* — Imperium Patent Works; Joseph S. Spano; Darien K. Wallace

(57) ABSTRACT

An LED lamp includes a rectifier, an integrated circuit and a string of series-connected LEDs. The lamp receives an incoming AC signal such that a rectified version of the signal is present across the LED string. The integrated circuit includes a plurality of power switches. Each power switch is coupled so that it can separately and selectably short out a corresponding one of several groups of LEDs in the string. As the voltage across the string increases the integrated circuit controls the power switches such that the number of LEDs through which current flows increases, whereas as the voltage across the string decreases the integrated circuit controls the power switches such that the number of LEDs through which current flows decreases. LED string current flow is controlled and regulated to provide superior efficiency, reliability, anti-flicker, regulation against line voltage variations, power factor correction, and lamp over-voltage, over-current, and over-temperature protection.

32 Claims, 17 Drawing Sheets

LED LAMP

FIRST EMBODIMENT

LED LAMP

NOMINAL AC VOLTAGE OPERATION (110VAC)

+10% HIGH AC VOLTAGE OPERATION (121VAC)

-30% LOW AC VOLTAGE OPERATION (77VAC)

(EACH LED SYMBOL = 1 LED FOR 110VAC, OR 2 LEDS FOR 220VAC)

SECOND EMBODIMENT

LED LAMP

THIRD EMBODIMENT

| LEDCOUNT | 0 | 0 | 0 | 0 | 0 | 1 | 1 | 1 | 1 | 1 | 2 | 2 | 2 | 2 | 2 | 3 | 3 | 3 | 3 | 3 | 4 |
|---|---|---|---|---|---|---|---|---|---|---|---|---|---|---|---|---|---|---|---|---|---|
| SCATTER | 0 | 1 | 2 | 3 | 4 | 0 | 1 | 2 | 3 | 4 | 0 | 1 | 2 | 3 | 4 | 0 | 1 | 2 | 3 | 4 | X |
| NG0 | 0 | 1 | 1 | 1 | 1 | 0 | 1 | 1 | 0 | 1 | 0 | 0 | 1 | 0 | 1 | 1 | 0 | 0 | 0 | 0 | 0 |
| NG1 | 1 | 1 | 1 | 0 | 1 | 1 | 0 | 1 | 1 | 0 | 1 | 0 | 0 | 1 | 0 | 0 | 0 | 0 | 1 | 1 | 0 |
| NG2 | 1 | 0 | 1 | 1 | 1 | 0 | 1 | 0 | 1 | 1 | 0 | 1 | 0 | 0 | 1 | 0 | 1 | 0 | 0 | 0 | 0 |
| NG3 | 1 | 1 | 1 | 1 | 0 | 1 | 0 | 1 | 0 | 1 | 1 | 0 | 1 | 0 | 0 | 0 | 0 | 0 | 0 | 1 | 0 |
| NG4 | 1 | 1 | 0 | 1 | 1 | 1 | 1 | 0 | 1 | 0 | 0 | 1 | 0 | 1 | 0 | 0 | 0 | 1 | 0 | 0 | 0 |

LOOKUP ROM

US 8,299,724 B2

AC LED LAMP INVOLVING AN LED STRING HAVING SEPARATELY SHORTABLE SECTIONS

TECHNICAL FIELD

The present disclosure relates generally to Light-Emitting Diode ("LED") supply, control, and protection circuits; and more specifically to Alternating Current ("AC") driven LED supply, control, and protection circuits.

BACKGROUND INFORMATION

Light-Emitting Diodes or "LEDs" are increasingly being used for general lighting purposes. In one example, a group of so-called white LEDs is powered from an AC power source. The term "AC LED" is sometimes used to refer to such circuits. AC LED circuits that utilize opposing strings of parallel-connected LEDs are described in the following U.S. Pat. Nos. 5,495,147, 6,830,358, 7,045,965, 7,138,770, 7,264,381, and 7,344,275. AC LED circuits involving bridge-rectified LED strings are described in the following U.S. Pat. Nos. 5,463,280 and 7,276,858. U.S. Patent Application Publication US2007/0008721 shows a network of parallel-connected AC LEDs connected in multiple ways.

FIG. 1 (Prior Art) is a diagram of one AC LED lamp circuit that requires neither an AC-to-DC converter nor a rectifier. Although a DC voltage can be supplied, an AC voltage is typically supplied between input terminals 1 and 2. Terminals 1 and 2 may, for example, be coupled to receive 110 VAC line power. If the voltage on terminal 1 is higher than the voltage on terminal 2, then current flows from terminal 1, through current-limiting resistor 3, to node 4, then through a first string of series-connected LEDs 5 to node 6, then through current-limiting resistor 7, and to terminal 2. If the voltage on terminal 1 is lower than the voltage on terminal 2, then current flows in the opposite direction from terminal 2, through current-limiting resistor 7 to node 6, through a second string of series-connected LEDs 8 to node 4, then through current-limiting resistor 3, and to terminal 1.

FIG. 2 (Prior Art) is a diagram of a second AC LED lamp circuit. This circuit employs a full-wave rectifier 9. A DC or AC signal is received on terminals 10 and 11. Terminals 10 and 11 may, for example, be coupled to receive 110 VAC line power. On each half-cycle of an incoming AC signal both LED strings 12 and 13 emit light, but the extra cost of providing the full-wave rectifier 9 is involved. As in the case of the circuit of FIG. 1, current flow is limited by providing current-limiting resistors 14 and 15.

Effective use of the AC LED circuits of FIGS. 1 and 2 generally requires good control and matching of the line in AC voltage to the voltage drop across the LEDs to ensure stability, and/or requires adding current-limiting resistors as illustrated to limit the current variation as the line voltage or LED voltage drop changes. A disadvantage of the current-limiting resistor approach is power loss. This power loss results in lower efficiency of the LED lamp and higher heat generation.

In a 110 VAC operational example of the circuit of FIG. 2, an effective 625 ohm resistance is disposed in series with the LED strings operating at 110 VAC and forty milliamperes RMS. This results in one watt of resistive power loss for a four watt LED lamp. This amounts to a twenty-six percent loss of efficiency. In a 220 VAC operational example, an effective 2.5 k ohm resistance is disposed in series with the LED strings operating at 220 VAC and twenty milliamperes RMS. This results in one watt of resistive power loss for a four watt LED Lamp. This amounts to a twenty-six percent loss of efficiency. Because the RMS voltage drop across the current-limiting resistances is approximately twenty-six percent of the AC line RMS voltage, a ten percent increase in the AC line voltage results in approximately a forty percent increase (10 percent/26 percent) in LED current. This increase in LED current causes seventy percent more power loss across the resistances, causes increased heat dissipation, and causes a roughly fifty percent increase in power consumption. Likewise, a ten percent reduction in line voltage results in an observable thirty-six percent drop in LED current.

To avoid such resistive power loss, capacitor-coupled AC LEDs have been proposed. For example, U.S. Pat. Nos. 6,972,528 and 7,489,086 disclose using a capacitor in series with parallel-connected opposing LED pairs for high frequency decoupling. A disadvantage of this approach is the need to provide a high value capacitor. Another disadvantage is its reliance on a stable dV/dt and its general incompatibility with triac dimming. Such a circuit can be driven with a high frequency AC source controller, but doing so requires complicated circuitry for the high frequency driver.

U.S. Pat. No. 6,577,072 sets forth another approach that uses non-monolithic circuitry comprising a switch connected to a string of LEDs in parallel with storage capacitors. The switch is turned off when the line voltage drops below a certain level so that the LEDs are supplied by the capacitors. This is not a loss-less approach because the drained capacitors require recharging through the switch. Furthermore, light output of the LEDs is not regulated against changes in line voltage.

SUMMARY

An AC LED lamp includes a rectifier, an integrated circuit and a string of series-connected LEDs. The AC LED lamp receives and is powered by an incoming AC signal such that a rectified version of the signal is present across the LED string. The integrated circuit includes a plurality of power switches. Each power switch is coupled so that it can separately and selectably short out a corresponding one of several groups of LEDs in the LED string. The groups are also referred to as sections of the LED string. As the voltage across the LED string increases, the integrated circuit controls the power switches such that the number of LEDs through which current flows increases. As the voltage across the string decreases, the integrated circuit controls the power switches such that the number of LEDs through which current flows decreases.

In the AC LED lamp, the number of LEDs conducting current and the LED string current flow are controlled and regulated to provide superior efficiency, reliability, anti-flicker, regulation against line voltage variations, power factor correction, lamp over-voltage protection, lamp over-current protection, and lamp over-temperature protection. Employing the disclosed lamp architecture allows a high-efficiency solid-state AC LED lamp to be realized that involves no electrolytic capacitor and that only involves a relatively small number of components. Avoiding the use of an electrolytic capacitor prevents electrolytic capacitor failures that may otherwise degrade reliability if electrolytic capacitors were included in the AC LED lamp. The reduced component count improves lamp reliability and extends the mean time to failure of the lamp. Electromagnetic Interference (EMI) issues are minimized as compared to many AC-to-DC converter LED lamps because the novel AC LED lamp described here does not involve high frequency power switching.

Other structures and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
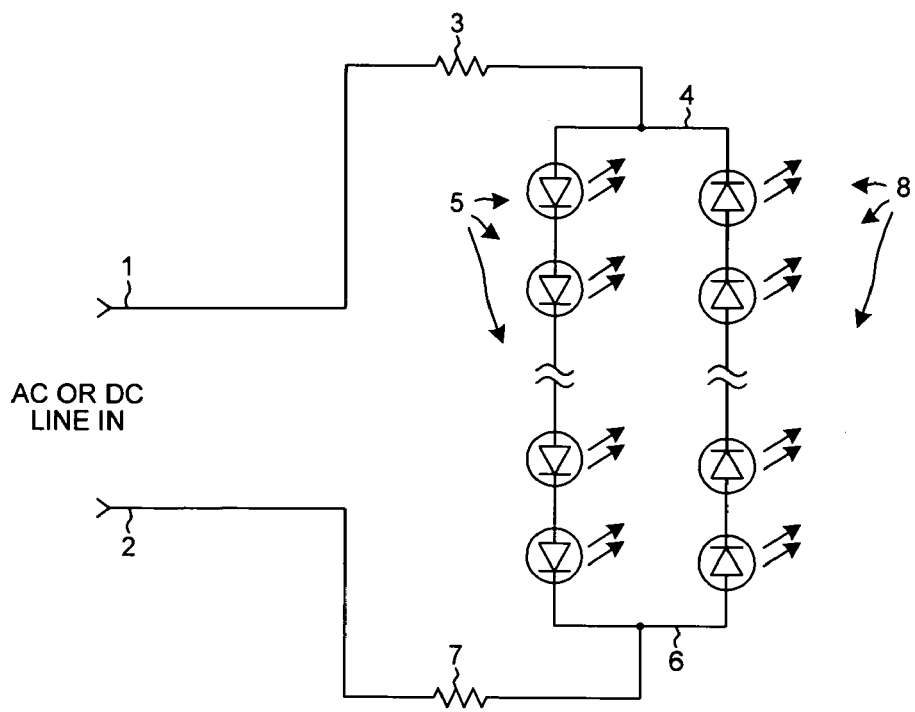
FIG. 1 (Prior Art) is a diagram of an AC LED lamp circuit that does not require an AC-to-DC converter or a rectifier.
Figure 2:
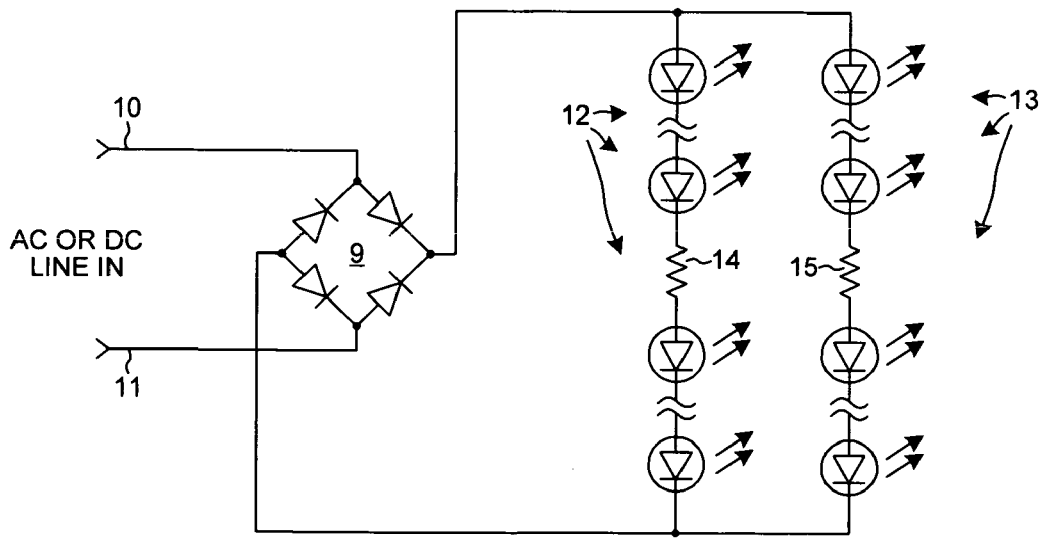
FIG. 2 (Prior Art) is a diagram of an AC LED lamp circuit involving a rectifier.
Figure 3:
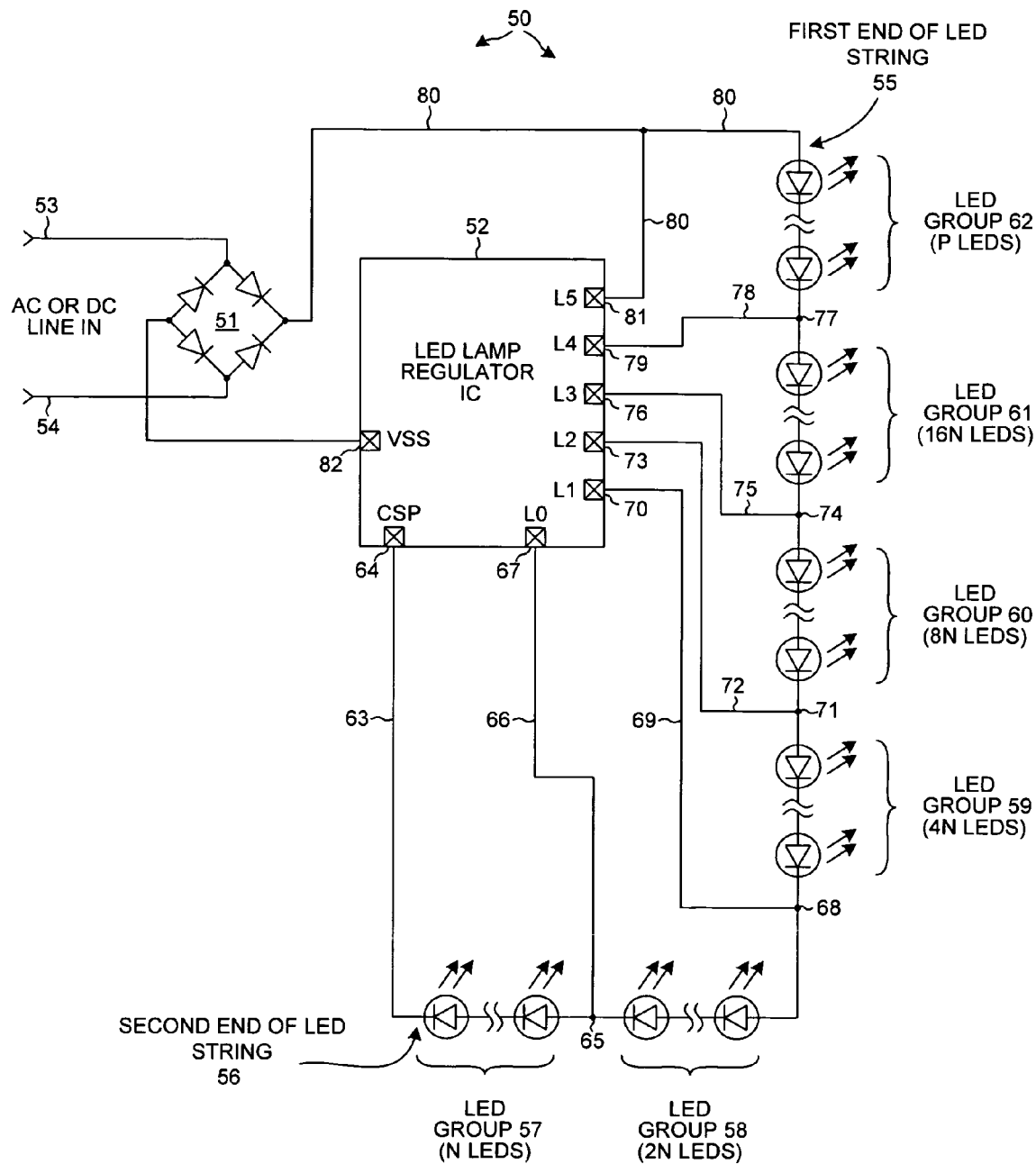
FIG. 3 is a diagram of a first embodiment of an AC LED lamp in accordance with one novel aspect.

FIG. 3 is a circuit diagram of an AC LED lamp 50 in accordance with a first embodiment. The AC LED lamp 50 includes a full-wave rectifier 51, an LED lamp regulator integrated circuit (also referred to as a control integrated circuit) 52, and a string of series-connected LEDs. Rectifier 51 is connected to input power terminals 53 and 54 as illustrated. Either an AC or a DC line in input power signal is received on terminals 53 and 54.

The LED string has a first end 55 and a second end 56. The LED string in turn includes several sections 57-62. A section is also referred to here as a group of LEDs. The illustrated nodes between the various LED groups are referred to here loosely in a non-technical sense as interconnection nodes. As illustrated in FIG. 3 second end 56 of the LED string is coupled via a conductor 63 to CSP terminal 64; interconnection node 65 of the LED string is coupled via a conductor 66 to LO terminal 67 of integrated circuit 52; interconnection node 68 of the LED string is coupled via a conductor 69 to L1 terminal 70 of integrated circuit 52; interconnection node 71 is coupled via a conductor 72 to L2 terminal 73 of integrated circuit 52; interconnection node 74 is coupled via a conductor 75 to L3 terminal 76 of integrated circuit 52; and interconnection node 77 is coupled via a conductor 78 to L4 terminal 79 of integrated circuit 52, and first end 55 of the LED string is coupled via a conductor 80 to L5 terminal 81 of integrated circuit 52.

AC LED lamp 50 is supplied by the AC or DC line in voltage signal on input power terminals 53 and 54. The AC line in signal may, for example, be a 60 Hertz AC sinusoidal signal having a 110 volt amplitude. This AC line in signal is rectified by a full-wave rectifier 51 resulting in a rectified line voltage signal being present between VSS terminal 82 and L5 terminal 81. The reference numeral 80 represents a conductor and node that extends from the rectifier 51 to L5 terminal 81 and to the first end 55 of the LED string. Under the right operating conditions, integrated circuit 52 allows current to flow through various selected groups of the LEDs of the LED string, and then through the integrated circuit 52, out of VSS terminal 82, and back to rectifier 51. Integrated circuit 52 selectively shorts out selected groups of LEDs and switches in selected groups of LED to change the number of LEDs in the LED string current path, thereby regulating the overall LED string current and power. For example, a single cycle of a 110 VAC line in sinusoidal AC signal on input power terminals 53 and 54 may be considered to have a voltage amplitude that varies from a zero degree phase to a 360 degree phase. At the zero degree time in the waveform, the voltage of the corresponding rectified AC line in signal on conductor 80 is increasing, or starting to increase, from a minimum value. The voltage on conductor 80 increases from this time of the zero degree phase to a time of ninety degree phase. During the time of this first ninety degrees, the total number of LEDs through which current is allowed to flow is made to increase so that the forward voltage drop across the LED string essentially matches the instantaneous rectified line voltage. Then, as the voltage on conductor 80 decreases from the time of ninety degrees phase to the time of one hundred-eighty degrees phase, the total number of LEDs through which current is allowed to flow is made to decrease so that the forward voltage drop across the LED string essentially matches the instantaneous rectified line voltage. By substantially matching the voltage drop across the entire LED string (for example, from end 55 to end 56 including any LED groups that are shorted out) to the instantaneous rectified line voltage on conductor 80 as the rectified line voltage increases and decreases, superior lamp efficiency is achieved. The average efficiency loss of AC LED lamp 50 is approximately equal to half of the voltage drop across the smallest LED group compared to the line voltage.

Figure 4:
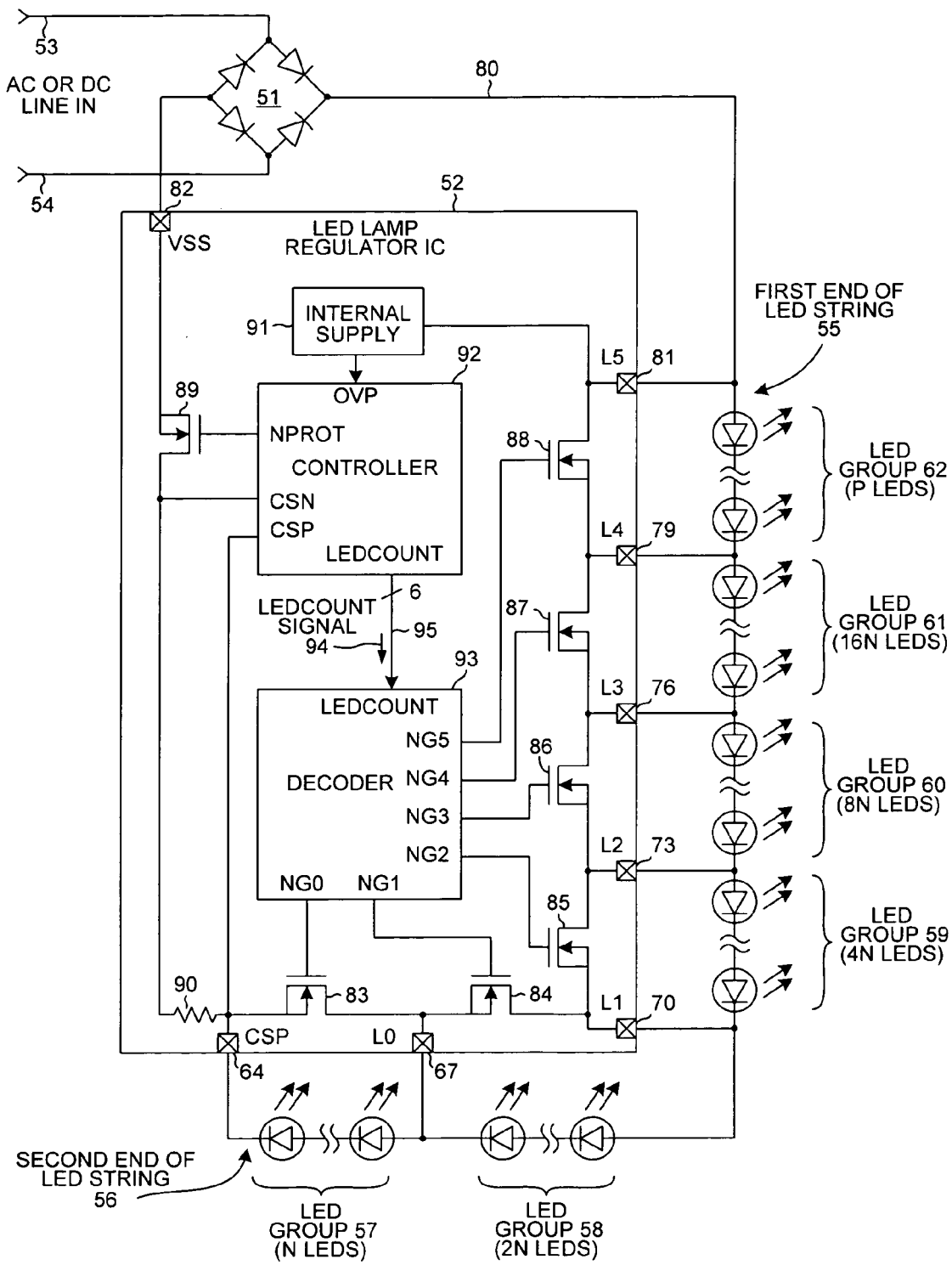
FIG. 4 is a more detailed diagram of the AC LED lamp of FIG. 3.

FIG. 4 is a diagram that shows integrated circuit 52 of the AC LED lamp 50 of FIG. 3 in further detail. In addition to terminals 64, 67, 70, 73, 76, 79 and 81, integrated circuit 52 also includes power switches 83-88, a protection power switch 89, a current sense resistor 90, an internal power supply circuit 91, a controller circuit 92, and a decoder 93.

Power switch 83 can be controlled to couple CSP terminal 64 to L0 terminal 67 thereby shorting out LED group 57; power switch 84 can be controlled to couple L0 terminal 67 to L1 terminal 70 thereby shorting out LED group 58; power switch 85 can be controlled to couple L1 terminal 70 to L2 terminal 73 thereby shorting out LED group 60; power switch 86 can be controlled to couple L2 terminal 73 to L3 terminal 76 thereby shorting out LED group 60; power switch 87 can be controlled to couple L3 terminal 76 to L4 terminal 79 thereby shorting out LED group 61; power switch 88 can be controlled to couple L4 terminal 79 to L5 terminal 81 thereby shorting out LED group 62. Power switches 83-88 are individually controlled by controller 92 and decoder 93. Internal supply circuit 91 generates an internal VCC supply voltage (not shown) and supplies that internal supply voltage to controller 92 and decoder 93 to power circuitry in those blocks. Controller 92 supplies a six-bit digital LEDCOUNT signal 94 onto six-bit bus 95. The LEDCOUNT signal indicates an optimal number of LEDs of the LED string that should be allowed to conduct current so that the total forward voltage drop across the LED string will be matched to the rectified line voltage on conductor 80 at a desired average LED current level. Current flow through the LED string is detected by current sense resistor 90. Decoder 93 converts the LED-COUNT signal into the appropriate gate drive signals for driving the gates of power switches 83-88 so that the indicated number of LEDs are switched into the LED string current path.

During normal operation, protection switch 89 is turned on to have minimal on-resistance and to close the LED string current path back to rectifier 51. Under a high current condition, however, the voltage on the gate of protection switch 89 is adjusted to limit current to a predetermined current limit. Under abnormal operating conditions as explained in further detail below, protection switch 89 is controlled to be open such that no current flows through the LED string and such that the LED string is protected from damage.

In a 110 VAC application the LED string includes approximately forty to fifty white LEDs coupled in series whereas in a 220 VAC application the LED string includes approximately eighty to one hundred white LEDs coupled in series. As illustrated, these LEDs are divided into five groups of N, 2N, 4N, 8N, and 16N LEDs each. The last group 62 includes the remaining P LEDs, such that (31N+P) is equal to the total number of LEDs in the LED string.

Figure 5:
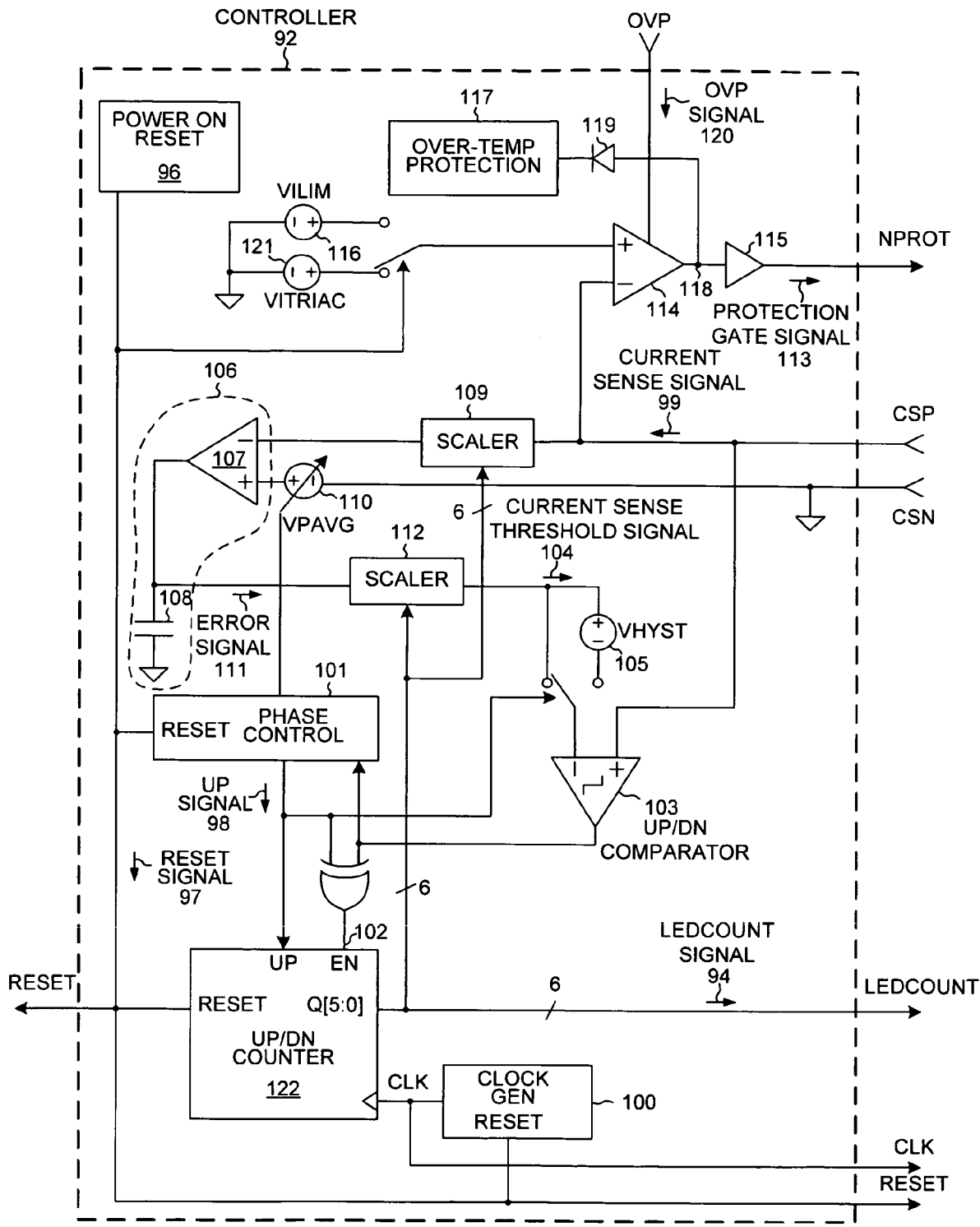
FIG. 5 is a more detailed diagram of the controller 92 of the integrated circuit 52 of FIG. 4.

FIG. 5 is a more detailed diagram of controller 92 of FIG. 4. LEDCOUNT signal 94 is the output of an up/down counter 122. When the instantaneous rectified line voltage on conductor and node 80 is lower than a Power On Reset Threshold (PORT), a power on reset circuit 96 asserts a reset signal 97. Reset signal 97 resets up/down counter 122 to a maximum count state. Setting counter 122 to this maximum count state ensures that a sudden line voltage step (such as due to a dimmer Triac turning on) will result in limited initial current across the LED string. An up signal 98 is set to a digital "low". When the instantaneous rectified line voltage is higher than the PORT threshold voltage, the integrated circuit 52 does a first adjustment to find an initial LEDCOUNT that matches the rectified line voltage. To do this, up/down counter 122 counts down until a current sense signal 99 indicates that an appropriate current is flowing through the LEDs. Current sense signal 99 is the voltage dropped across current sense resistor 90.

At this point, up signal 98 is set to a digital "high" and the circuit is ready to begin tracking the line voltage envelope. Up/down counter 122 is incremented or decremented at a rate determined by a clock signal CLK supplied by on-chip clock generator 100. If phase control circuit 101 detects that the rectified line voltage is increasing then up signal 98 is "high", whereas if phase control circuit detects that the rectified line voltage is decreasing then the up signal 98 is "low". If the up signal 98 is "high" (the rectified line voltage is increasing) and if an enable signal supplied onto the enable input 102 of the up/down counter 122 is asserted, then up/down counter 122 increments on the next rising edge of the clock signal CLK. The enable signal is asserted whenever an up/down comparator 103 has detected that the current sense signal 99 exceeds a Current Sense Threshold Signal 104 voltage (CSTS), until the condition no longer exists. When the up signal 98 is "high" and the enable signal is asserted and a rising clock edge occurs, then LEDCOUNT is incremented. Incrementing LEDCOUNT serves to switch more LEDs into the LED string current path.

On the other hand, if the up signal 98 is "low" then up/down counter 122 decrements on the next rising edge of the clock signal CLK whenever the up/down comparator 103 has detected that the current sense signal 99 is lower than the CSTS signal 104 minus a VHYST hysteresis voltage 105, until the condition no longer exists. Decrementing LED-COUNT serves to switch LEDs out of the LED string current path.

An integrating amplifier circuit 106 includes an amplifier 107 and a capacitor 108. Integrated amplifier circuit 106 linearly amplifies the voltage difference between instantaneous voltage of signal 99, as modulated by a scaler 109, and a VPAVG reference voltage supplied by reference 110. The amplified difference is integrated onto capacitor 108 to generate an error signal 111. The error signal 111 slowly increases if the average LED power is lower than a target LED power and decreases if the average LED power is higher than the target LED power. The average LED power of the LED string is therefore regulated to (SCALE·VF·VPAVG/R90), where SCALE is a constant dependent on the scaler 109 and the number of LEDs in the group of LEDs, and where R90 is the resistance of current sense resistor 90.

To make the circuit operable in applications involving a standard Triac dimmer, VPAVG is adjusted by the detected dimmer phase cut angle. In a standard Triac dimmer circuit, a Triac may open-circuit portions of the incoming AC signal or portions of the rectified line signal so as to reduce total power supplied to a lighting load. In the circuit of FIG. 5, phase control circuit 101 detects the phase of this open-circuit duration, which is referred to here as the dimmer "phase cut angle". Phase control circuit 101 adjusts VPAVG accordingly so that the more the phase cut, the lower the average LED power becomes.

Current sense threshold signal 104 for up/down comparator 103 is the error signal 111 from capacitor 108 as modulated by a scaler 112. Scaler 112 is controlled by the LED-COUNT signal 94. Scalers 109 and 112 may, for example, be realized as resistor ladders where the signal on a selected tap of the resistor ladder is output through an analog multiplexer controlled by the scaler control signal. If LEDCOUNT is a small value then the scaler 112 scales the error signal 111 by a small amount, whereas if LEDCOUNT is a large value then the scaler 112 scales the error signal 111 be a larger amount. By scaling the instantaneous LED string current so that its magnitude varies approximately proportionally to the number of LEDs in series, the phase angle of the LED string current signal over an AC cycle is adjusted with respect to the phase angle of the voltage drop signal (the voltage drop across the LED string). The power factor of the LED lamp is therefore adjusted and is approximately one.

Controller 92 also generates a protection gate signal 113 (NPROT) that controls protection switch 89. In normal operating conditions, protection gate signal 113 is driven by a current limit amplifier 114 through a buffer 115. When current sense signal 99 is lower than a VILIM threshold as set by voltage source 116, then current limit amplifier 114 drives the NPROT signal 113 "high" to turn on protection switch 89. When current sense signal 99 approaches the level of the VILIM threshold, then the NPROT signal 113 is reduced in magnitude to limit the current flow through the protection switch 89 such that the current sense signal 99 is regulated at approximately VILIM. As a result, the current flowing through the LED string is current limited. The LED current limit is determined by the quantity VILIM/R90. In addition, protection switch 89 is used to provide over-temperature protection. Whenever an over-temperature protection circuit 117 senses that its junction temperature has reached a predetermined temperature threshold, then over-temperature protection circuit 117 starts pulling the voltage on node 118 lower through diode 119. The lowering of the voltage on node 118 reduces the LED current. In an over-voltage condition, internal supply circuit 91 asserts an Over-Voltage Protection (OVP) signal 120 when the instantaneous rectified voltage exceeds a maximum threshold. When OVP is asserted, current limit amplifier 114 is disabled and protection gate signal 113 is low, and protection switch 89 is turned off.

Power on reset circuit 96 detects when the instantaneous rectified line voltage is less than a Power On Reset Threshold Voltage (PORTV). If the instantaneous rectified line voltage on conductor and node 80 is detected to be less than PORTV, then circuit 96 asserts signal RESET 97 to a digital high. This in turn resets up/down counter 122 to the maximum counter state, while simultaneously setting the LEDCOUNT value to a zero value. In addition, RESET signal 97 being a digital "low" also changes the reference threshold voltage of current limit amplifier 114 to a lower voltage VITRIAC. VITRIAC is set by a voltage reference 121. This causes all the power switches 83-88 to be on while protection switch 89 is on and regulating LED string current to a lower current limit level for triac dimmer trigger current and reset. This triac dimmer trigger current is determined by (VITRIAC/R90). A triac typically requires a small current flow to reset itself. Accordingly, when the instantaneous rectified line voltage is detected by power on reset circuit 96 to be lower than the PORTV threshold, then integrated circuit 52 ensures that there is always a small current flowing through the LEDs that exceeds the holding current level of a triac dimmer. A typical holding current required by an triac is fifteen milliamperes. Maintaining this small current flow also has the effect of smoothing out the light output of the lamp even when the instantaneous line voltage is low.

The human eye can often perceive undesirable flickering in a light source that is being turned on and off if the turn on and turn off rate is adequately low. To avoid such a problem in AC LED lamp 50, the turn on and turn off of the LED current is modulated to be 100 Hz or higher. To do this, the lamp is made to output light for most of the line voltage half period. Then, at the time of the peak of the line voltage, the LED current is reduced to zero or near zero. The LED light modulation frequency is therefore effectively four times the line voltage frequency (200 Hz LED light modulation frequency for 50 Hz line voltage, and 240 Hz LED light modulation frequency or 60 Hz line voltage). In one example, this anti-flicker operation is achieved by setting the OVP threshold just below the peak of the rectified line voltage so that LED light output is turned on and off at four times the line frequency.

Figure 6:
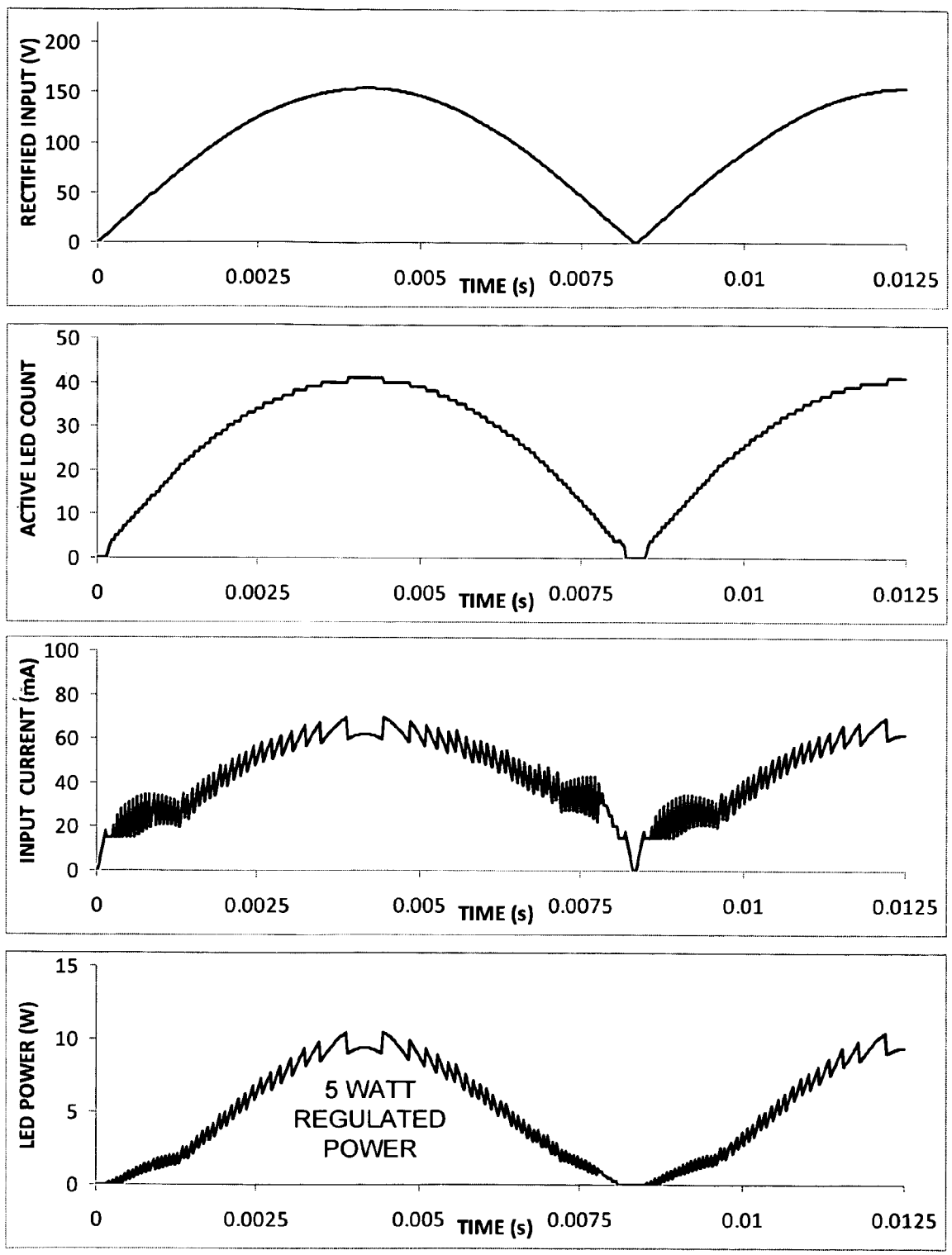
FIG. 6 is a waveform diagram that illustrates operation of the AC LED lamp of FIGS. 3 and 4 when the incoming AC line voltage is at a nominal value of 110 VAC.
Figure 7:
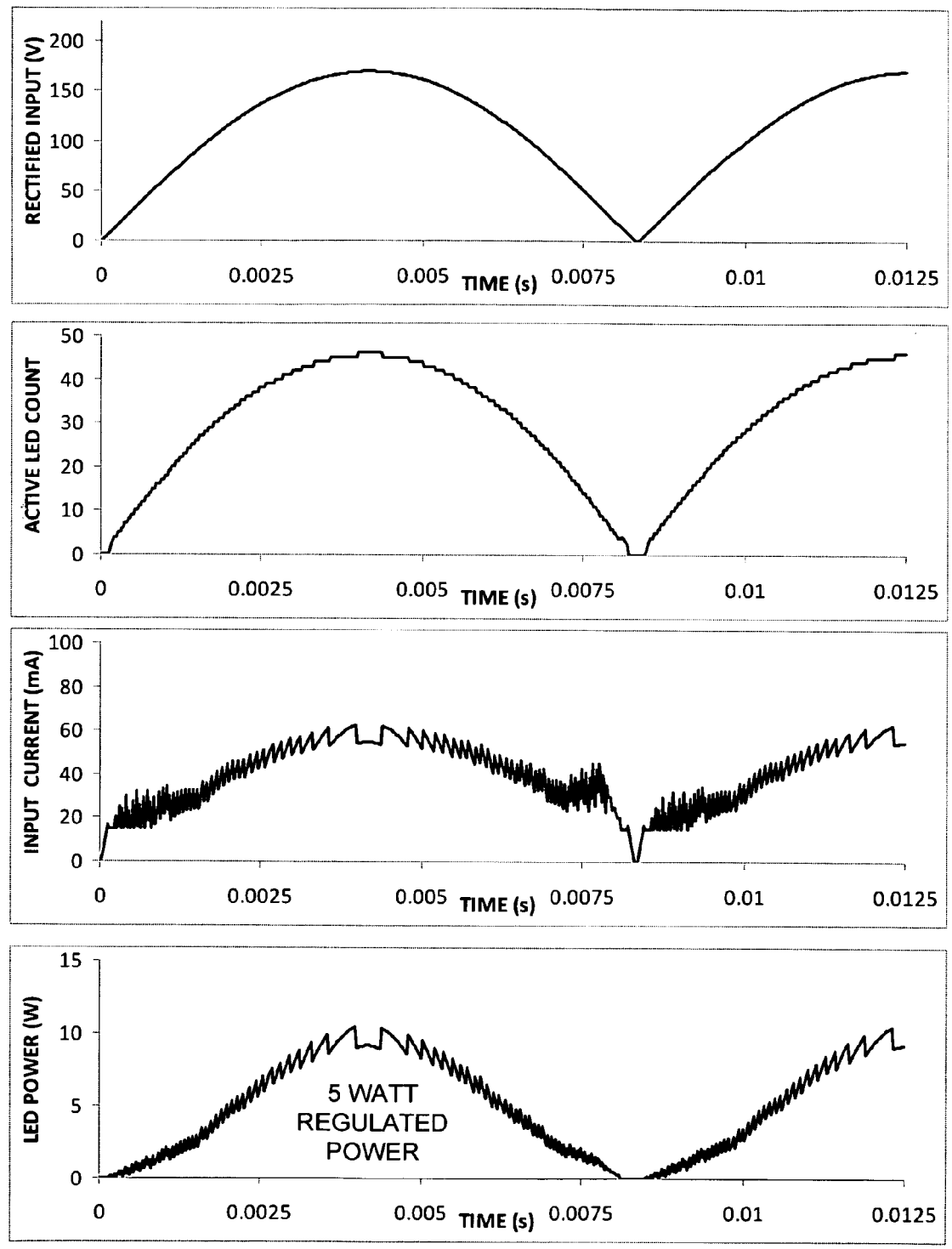
FIG. 7 is a waveform diagram that illustrates operation of the AC LED lamp of FIGS. 3 and 4 when the incoming AC line voltage is ten percent higher than nominal.
Figure 8:
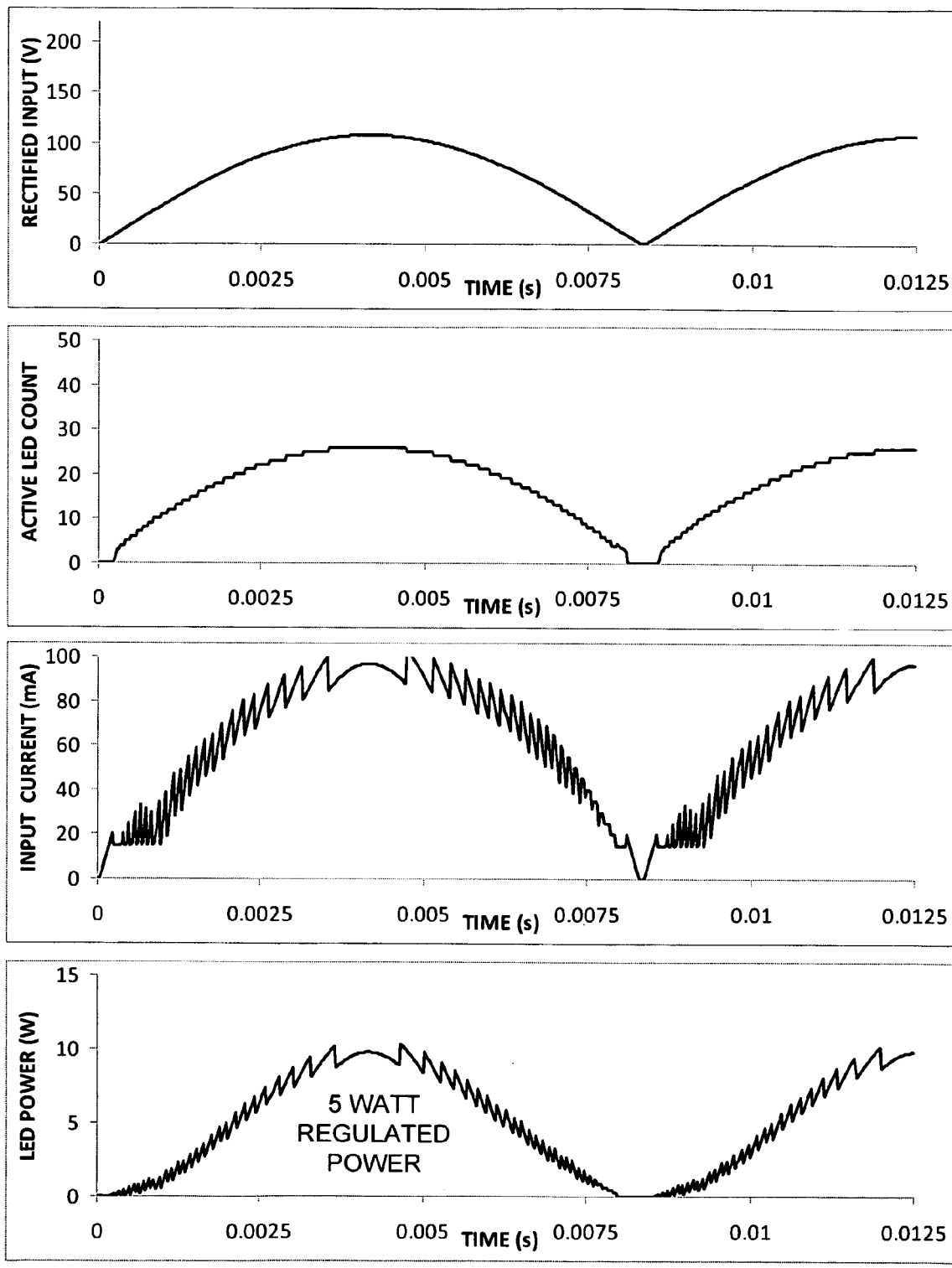
FIG. 8 is a waveform diagram that illustrates operation of the AC LED lamp of FIGS. 3 and 4 when the incoming AC line voltage is thirty percent lower than nominal.

FIGS. 6, 7, and 8 are waveform diagrams that illustrate operation of the AC LED lamp 50 of FIGS. 3 and 4 when the incoming AC line voltage signal is at a nominal value of 110 VAC, when it is ten percent higher than nominal, and when it is thirty percent lower than nominal, respectively. In the exemplary circuit, the number of LEDs in groups 57, 58, 59, 60, 61, and 62 are one, two, four, eight, sixteen, and eighteen, respectively (N=1). Current sense resistor 90 has a small resistance of approximately 43.3 ohms, the voltage drop across resistor 90 is small (for example, well less than one volt), and power loss across resistor 90 is small. LED power is a regulated five watts and this value does not change even if the amplitude of the incoming AC line voltage signal varies from 77 VAC to 143 VAC.

The upper waveform in FIG. 6 labeled "RECTIFIED INPUT (V)" shows the waveform of the rectified voltage signal on conductor 80 in FIG. 3. The next waveform down in FIG. 6 labeled "ACTIVE LED COUNT" shows how the number of LEDs (LEDCOUNT) of the LED string that are made to conduct LED string current. Although the CLK signal is not shown in FIG. 6, the LEDCOUNT only increases at the time of a rising edge of the signal CLK. In conditions in which the rectified input voltage is only slowly changing, such as at the top of the rectified sinusoidal wave illustrated in FIG. 6, the LEDCOUNT increases less frequently that it does when the rectified input voltage is changing more rapidly. In the "ACTIVE LED COUNT" waveform, note that the LEDCOUNT is zero (or a very small value to assure triac reset current) during times of low line voltage. At these times the circuit is being reset by the signal RESET 97 as explained above. The third waveform down in FIG. 6 labeled "INPUT CURRENT (mA)" involves a series of sawtooth-like wave shapes during the time the rectified input voltage is increasing. The more slowly rising portion of each such sawtooth-like wave shape represents the increasing LED string current as the rectified input voltage is increasing through a fixed number of LEDs. When the LED string current as sensed across current sense resistor 90 exceeds the current sense threshold signal 104, then up/down comparator 103 enables up/down counter 122 and up/down counter 122 increments on the next edge of CLK. This incrementing switches more LEDs into the LED string current path, and this results in the sharp decrease in LED string current. This sharp decrease is represented by the sharp downward portion of sawtooth-like wave shape.

The sawtooth-like wave shapes that occur during the time the rectified input voltage is decreasing have inverted shapes as compared to the sawtooth-like wave shapes that occur during the time the rectified input voltage is increasing. The inverted sawtooth-like wave shapes that occur during the time the rectified input voltage is decreasing involve a more slowly decreasing input current portion. This decreasing input current portion is due to the decreasing rectified line voltage being dropped across a fixed number of LEDs in the LED string. When the current gets so low that it falls below the current sense threshold signal 104, then up/down comparator 103 enables up/down counter 122. Up/down counter 122 decrements, thereby reducing the number of LEDs in the LED string through which LED current passes. As a result, the LED string current rises in an almost vertical fashion. This sharp increase is represented by the sharp upward portion at the end of the inverted sawtooth-like wave shape.

Figure 9:
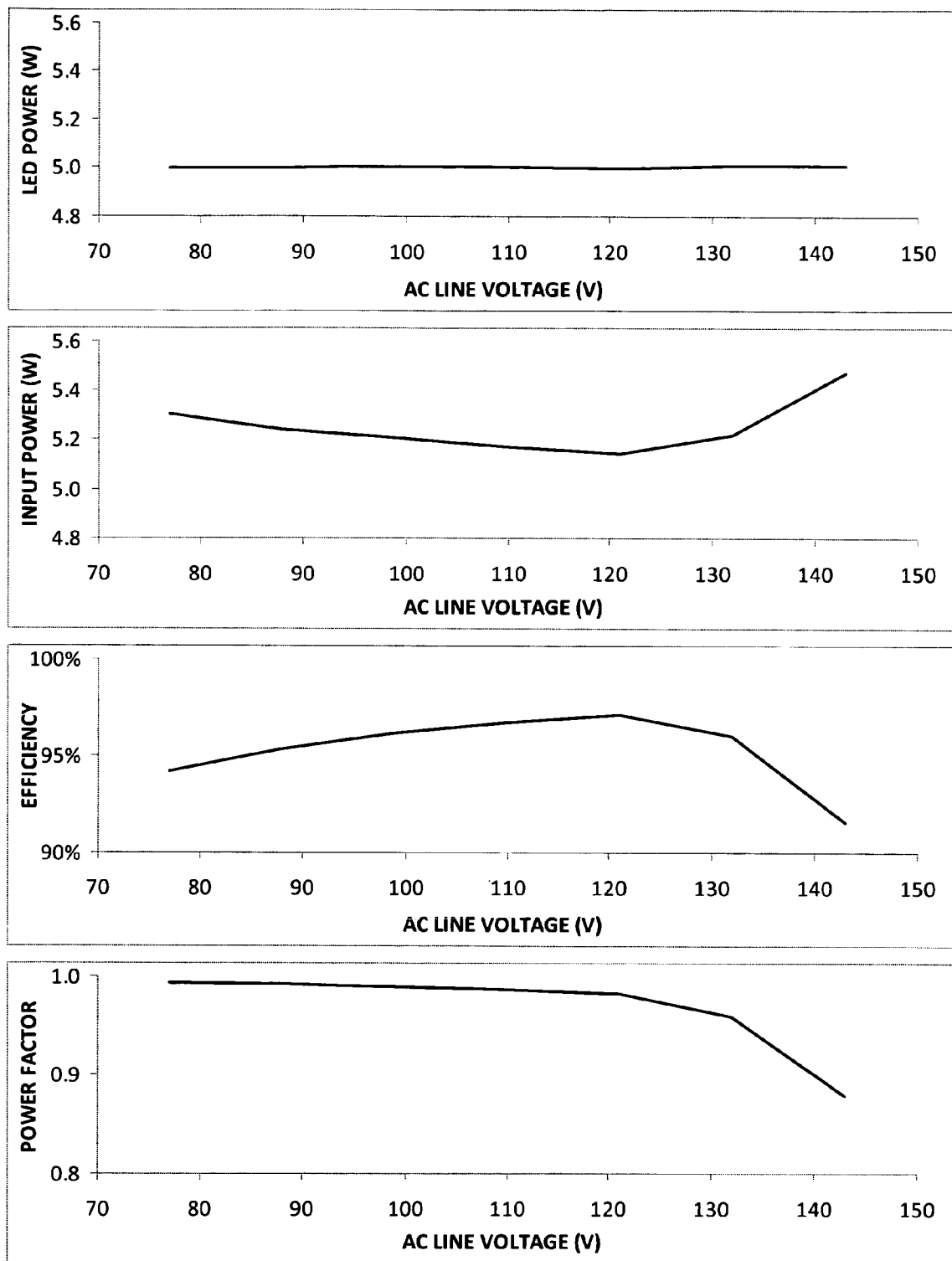
FIG. 9 is a set of waveform diagrams that shows the LED power, the input power, the efficiency, and the input power factor of the AC LED lamp 50 of FIGS. 3 and 4 as the input line voltage changes.

FIG. 9 is a set of waveform diagrams that shows the LED power, the lamp input power, the efficiency, and the input power factor of the AC LED lamp 50 of FIGS. 3 and 4 for input AC line in voltages ranging 80 VAC to 140 VAC. It can be seen that the light output (LED power) is well regulated for a wide range of line in voltages. It can also be seen that the efficiency is typically ninety-six percent (including a one percent efficiency loss due to the rectifier 51) which is superior to switching conversion or current-limiting resistor topologies. Finally, it can be seen that the power factor is at or near 0.97.

Figure 10:
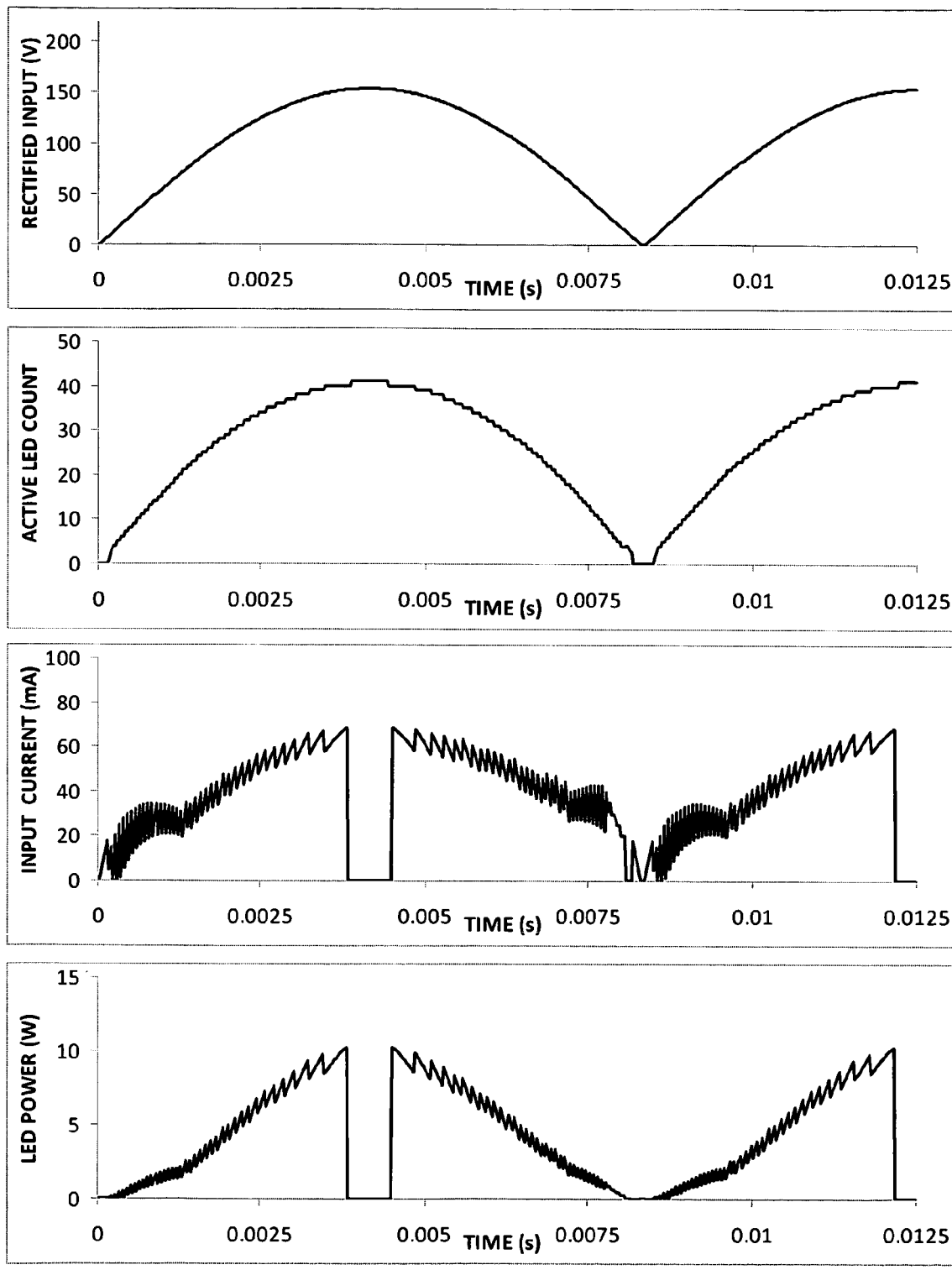
FIG. 10 is a set of waveform diagrams that shows the anti-flicker operation of the AC LED lamp 50 of FIGS. 3 and 4.

FIG. 10 is a set of waveform diagrams that shows the anti-flicker operation of the AC LED lamp 50. When this feature is enabled, the LED current is turned off at an OVP level just below the peak of the rectified line voltage. Note, for example, that there is a period of zero or near zero LED current as indicated by the third waveform at a time when the rectified input voltage is at its peak. Moreover, there is very little LED current flowing during the time when the rectified input voltage is at its minimum. In combination, the overall result is a LED light modulation frequency of 240 Hz even though the AC input signal on terminals 53 and 54 is a 60 Hz signal.

Figure 11:
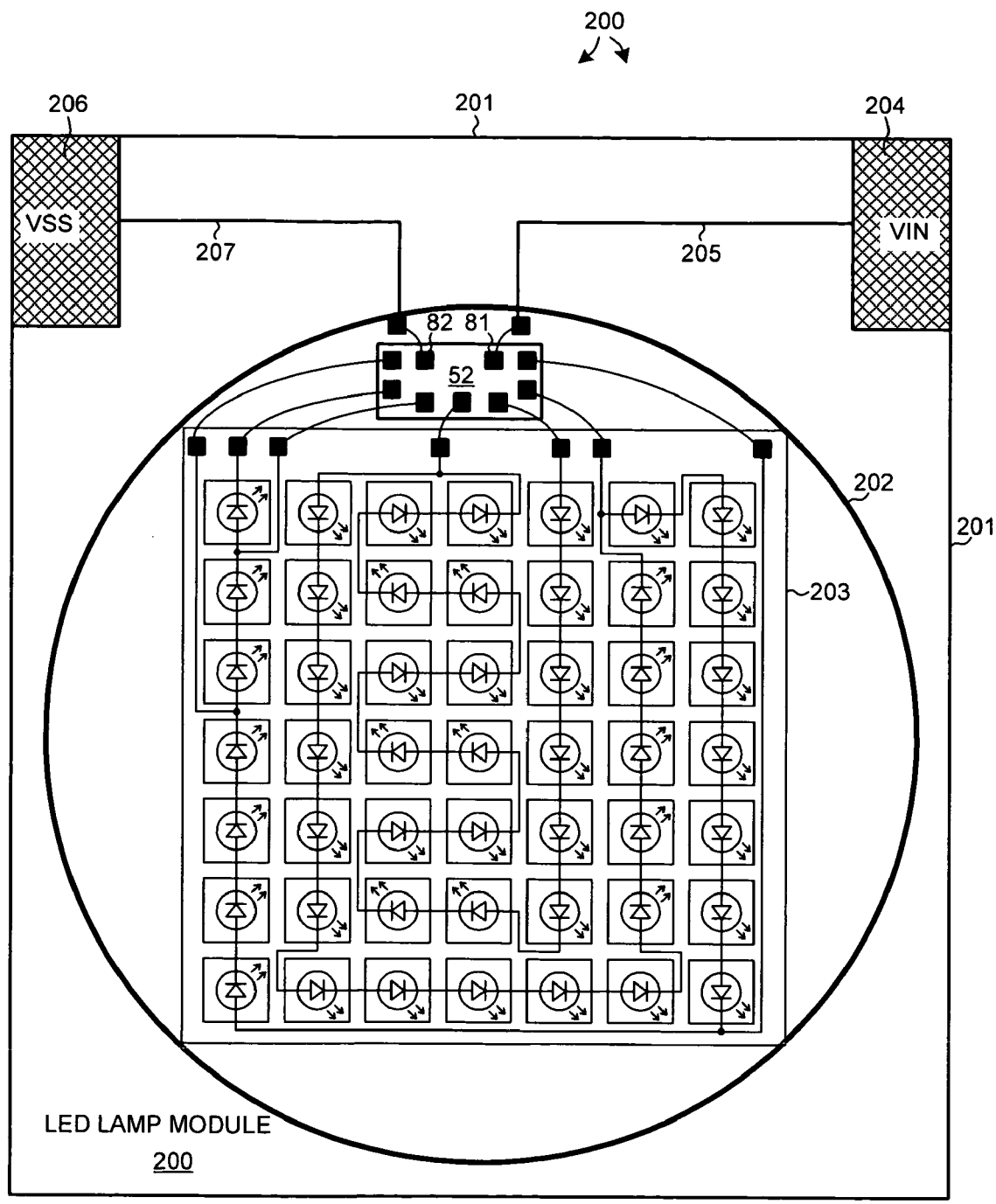
FIG. 11 is a top down diagram of an exemplary LED lamp module 200 that includes the integrated circuit 52 of FIGS. 4 and 5.

FIG. 11 is a simplified top down diagram of an exemplary LED lamp module 200. Module 200 includes a printed circuit board or substrate such as a metal core printed circuit board 201, the integrated circuit 52 of FIGS. 3 and 4, an optical lens 202, and a die 203 of LEDs. Either forty-nine or ninety-eight individual LEDs are realized on die 203. Although reference numerals are not provided to identify all the LEDs in the diagram of FIG. 11 due to space limitations on the diagram, the LEDs illustrated in FIG. 11 are the same LEDs illustrated in FIG. 4. The optical lens 202 redirects emitted light in the desired directions. Metal core printed circuit board 201 is thermally conductive and electrically isolated. In the example of FIG. 11, integrated circuit 52 is a semiconductor die that is wire bonded to the printed circuit board 201 and to die 203 with bond wires as illustrated. Alternatively, integrated circuit 52 can be provided with chip scale micro-bumps such that integrated circuit 52 is bonded directly to printed circuit board 201. A pad 204 for receiving VIN (the rectified input line signal from rectifier 51) is provided. Pad 204 is coupled by conductor 205 and a bond pad and a bond wire to L5 terminal 81 of the integrated circuit 52. A pad 206 for coupling to ground (VSS from rectifier 51) is provided. Pad 206 is coupled by conductor 207 and a bond pad and a bond wire to VSS terminal 82 of integrated circuit 52. For an embodiment in which the line in voltage signal is 110 VAC, each individual LED symbol on the representation of die 203 indicates one LED, whereas for an embodiment in which the line in voltage signal is 220 VAC each individual LED symbol indicates two LEDs in series. Although the LEDs in this example are all disposed on a single die, this need not be the case. Individual LEDs can be provided and oriented with respect to one another and with respect to lens 203 as illustrated.

Figure 12:
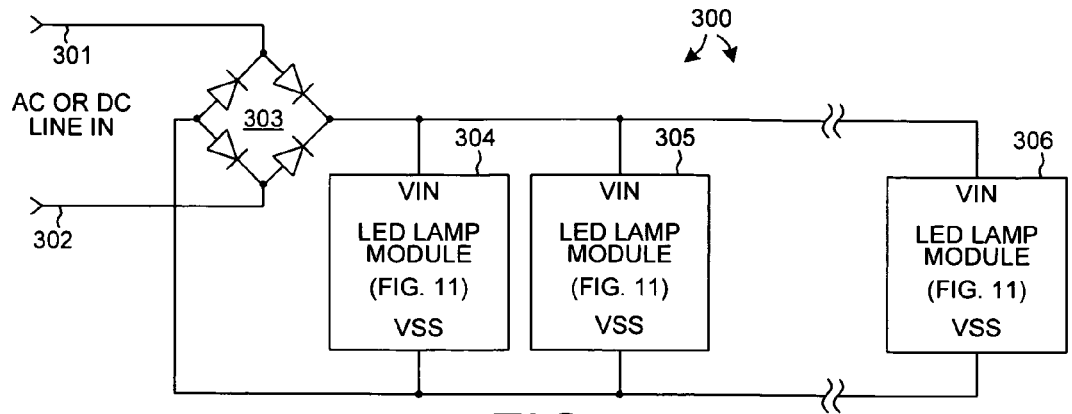
FIG. 12 is a schematic diagram of an AC LED lamp made out of multiple LED lamp modules such as the module illustrated in FIG. 11.

FIG. 12 is a schematic diagram of an AC LED lamp 300. Lamp 300 includes input terminals 301 and 302, one diode rectifier bridge 303 and multiple modules 304-306 of the type illustrated in FIG. 11. The modules are connected in parallel as illustrated. There is no limitation of how many modules can be placed in parallel. This arrangement can be used for multiple different types of luminaires that require multiple lamp modules placed at different distances from each other. This flexible arrangement can be used for multiple different types of luminaires that require different numbers of LED modules. The modular design is advantageous in that it reduces inventory for the lamp manufacturer. The lamp manufacturer need only stock one type of LED lamp module, yet the manufacturer can make many different types of luminaires.

Figure 13:
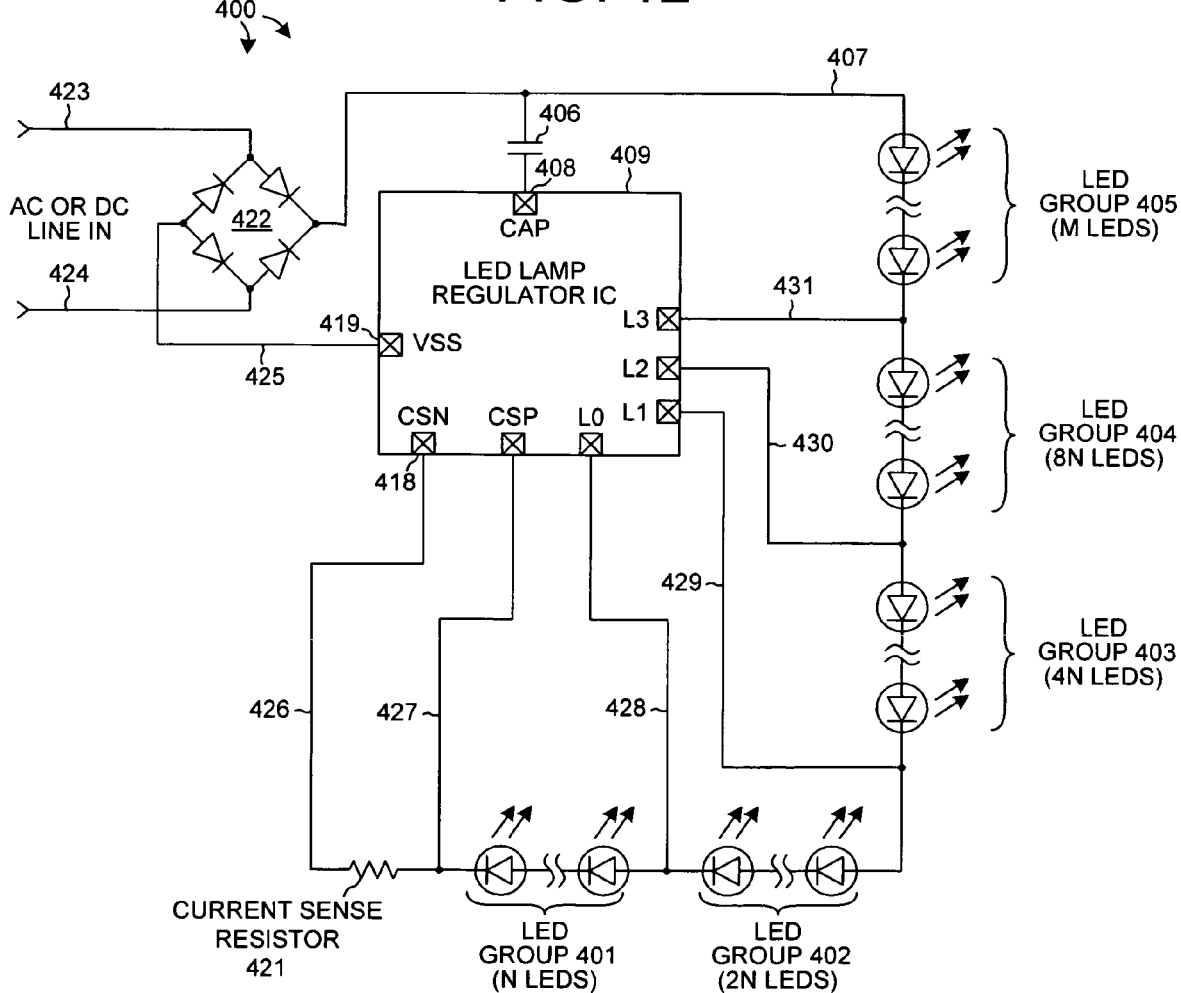
FIG. 13 is a diagram of a second embodiment of an AC LED lamp.

FIG. 13 is a diagram of a second embodiment of an AC LED lamp 400. In this embodiment, the number of power switches is reduced as compared to the embodiment of FIGS. 3 and 4. Only LED groups 401, 402, 403, and 404 are switched, whereas the remaining LEDs form LED group 405 and this group 405 is always in the LED string current path. This embodiment has a simplified design but has slightly lower efficiency. In an example for a 110 VAC line in signal, LED groups 401, 402, 403, and 404 have two, four, eight, and sixteen LEDs respectively (corresponding to N=2), whereas LED group 405 has approximately eighteen LEDs (corresponding to M=18). In an example for a 220 VAC line in signal, LED groups 401, 402, 403, and 404 have four, eight, sixteen, and thirty-two LEDs respectively (corresponding to N=4), whereas LED group 405 has approximately 36 LEDs (corresponding to M=36). To reduce flicker, a valley fill capacitor 406 is provided. Capacitor 406 is connected between node 407 and a CAP terminal 408 of integrated circuit 409. This valley fill capacitor 406 is charged to the voltage peak of the rectified line voltage on node 407, and is then disconnected from node 407 when the instantaneous line voltage is decreasing until the instantaneous line voltage has dropped below a voltage threshold, at which time it is reconnected to supply node 407 with charge. The result is a supplemented voltage on node 407 during the time when the instantaneous line voltage is at its valley.

Figure 14:
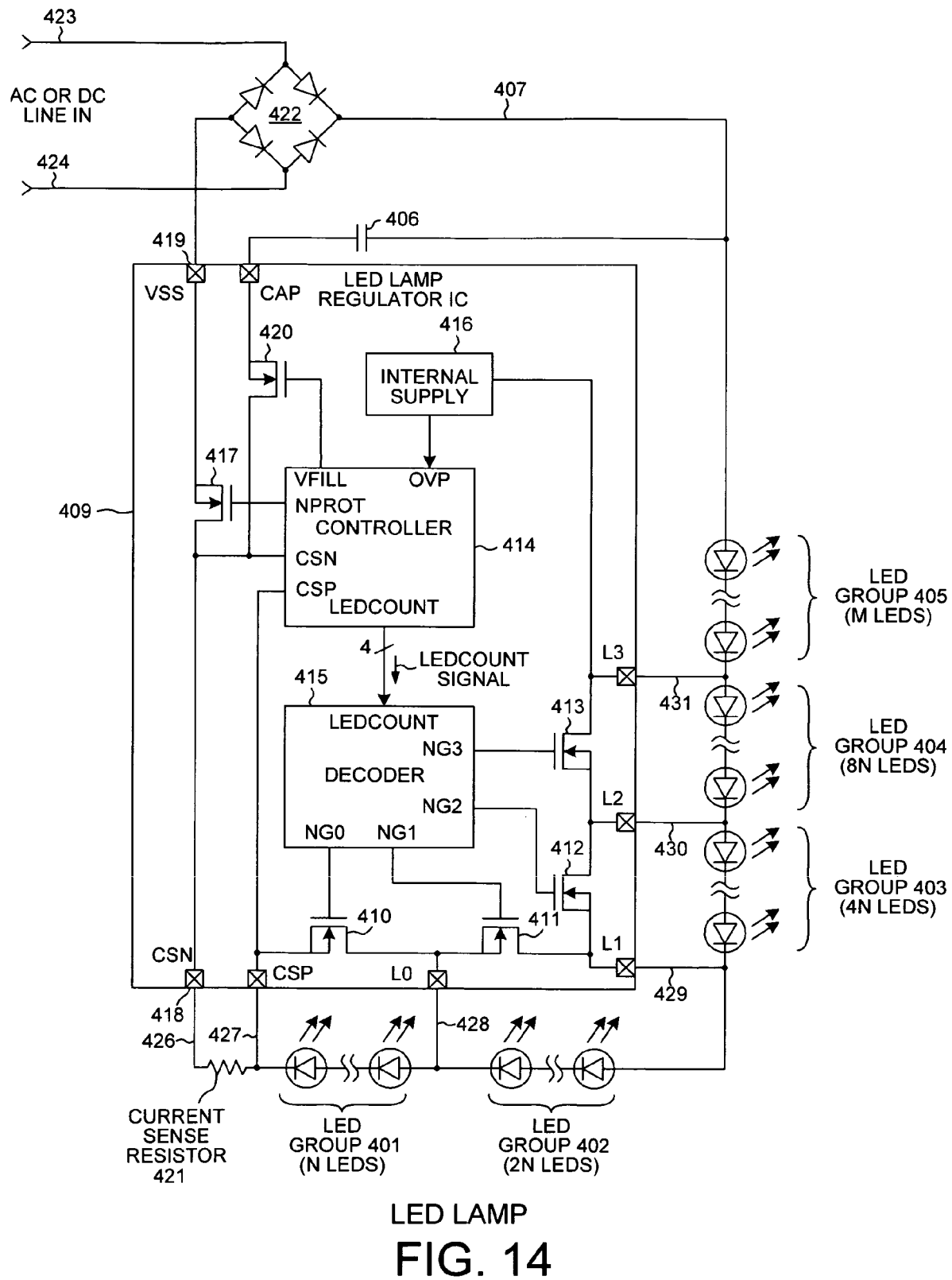
FIG. 14 is a more detailed diagram of the AC LED lamp of FIG. 13.

FIG. 14 is a more detailed diagram of integrated circuit 409 of FIG. 13. Integrated circuit 409 comprises power switches 410, 411, 412 and 413 for shorting out LED groups 401, 402, 403, and 404, respectively. The power switches are controlled by controller 414 and decoder 415, using an internal supply voltage VCC received from internal supply circuit 416. Controller 414 operates similarly to controller 92 in FIG. 4. Decoder 415 converts the LEDCOUNT signal received from controller 414 into the appropriate gate driving signals for the power switches 410-413 to enable current flow through the desired number of LEDs. In addition to power switches 410-413, a protection switch 417 connects CSN terminal 418 to VSS terminal 419 to enable LED string current flow during normal operation. A valley fill switch 420 is used to control charging of valley fill capacitor 406 to the peak rectified line voltage, and to control discharging of valley fill capacitor 406 at the appropriate time when the instantaneous line voltage is low. Valley fill switch 420 is latched on when the instantaneous rectified line voltage is increasing, and is latched off at the peak voltage. It is latched on again when the LEDCOUNT signal has dropped to a predetermined value. By using this valley fill technique, the light output of the lamp effectively flashes at four times the line frequency (200 Hz for 50 Hz line frequency and 240 Hz for 60 Hz line frequency) thereby minimizing motion-related flicker effects.

Figure 15:
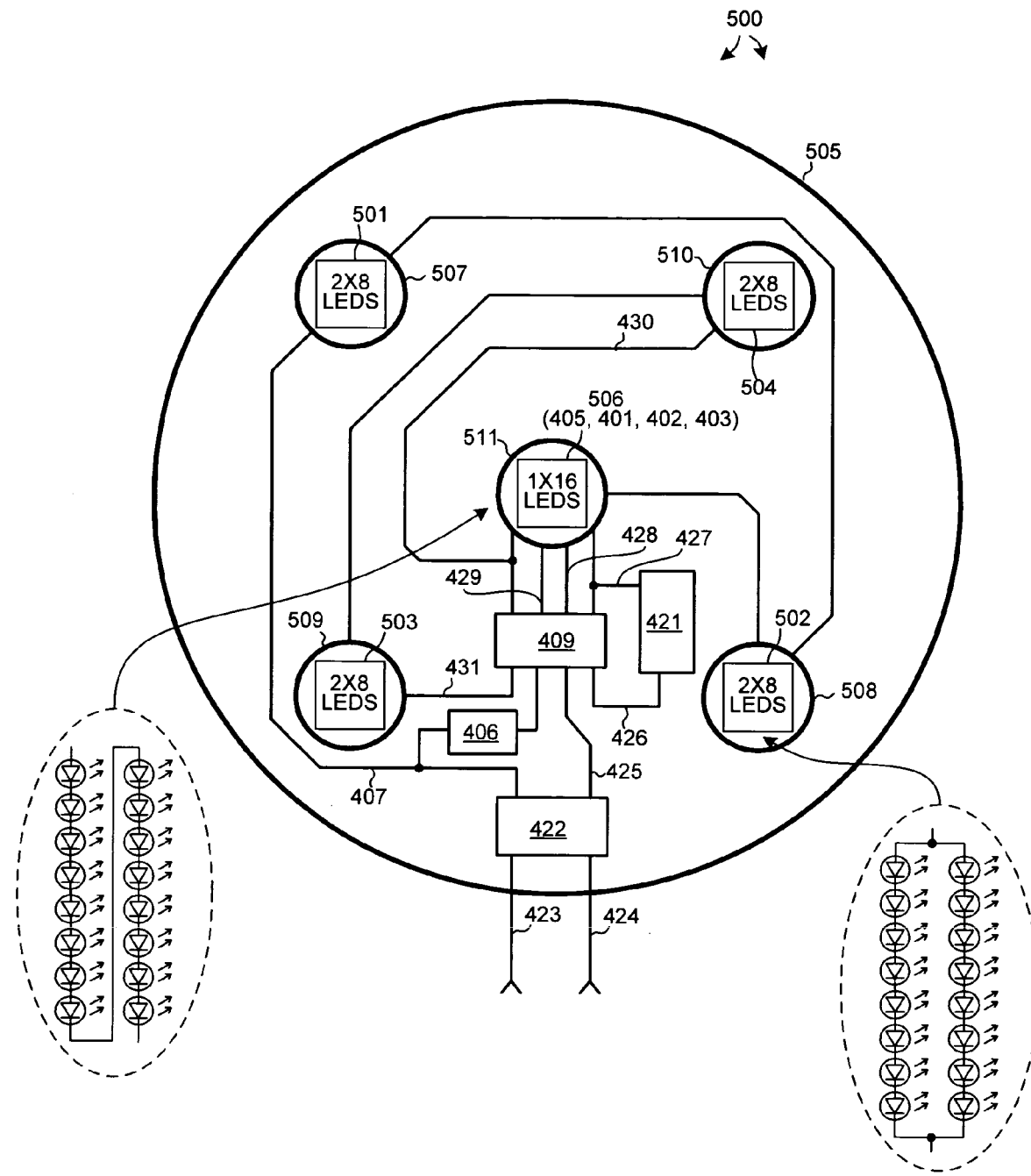
FIG. 15 is a diagram of an AC LED lamp structure that utilizes the circuitry of FIGS. 13 and 14.

FIG. 15 is a diagram of an AC LED lamp structure 500 utilizing the circuitry of FIGS. 13 and 14. Four 2×8 groups of LEDs 501-504 are used at the periphery of printed circuit board 505 in combination with one group of 1×16 LEDs 506 at the center. Each group of 2×8 LEDs involves sixteen light-emitting diode junctions connected as two strings where each string includes eight junctions in series, making it equivalent in behavior to one string of eight LEDs in series. All these LEDs are placed under an optical lens for focusing light. The circles 507-511 represent lenses. The group of 1×16 LEDs 506 has sixteen LEDs in series, all placed under optical lens 511 for focusing light. The groups of 2×8 LEDs together constitute LED group 405 of FIG. 14 (sixteen LEDs out of the eighteen total LEDs in series) and LED group 404 of Figure (sixteen LEDs in series). The group of 1×16 LEDs 506 is divided into binary segments of two, four, and eight LEDs. The group of 1×16 LEDs 506 constitutes LED group 405 (the two remaining LEDs), LED group 401, LED group 402, and LED group 403, respectively. Because the LEDs in LED groups 401, 402 and 403 operate at an approximate 50 percent duty cycle due to the transition in instantaneous line voltage, the power dissipation of the center 1×16 LED group 506 is of the same order as the power dissipation of peripheral groups of LEDs. Accordingly, all the groups of LEDs (501-504 and 506) can be made from the same or similar LED dice. Integrated circuit 409, current sense resistor 421, rectifier 422, a valley fill capacitor 406 are identified in FIG. 15 by their respective reference numerals. Input power terminals 423 and 424 of FIG. 13 are identified with like reference numerals in FIG. 15. Conductors 425-431 of FIG. 13 are identified with like reference numerals in FIG. 15. Integrated circuit 409 may be a packaged integrated circuit, a chip-scale micro-bumped silicon die, or a silicon die wire-bonded to printed circuit board 505.

In yet another embodiment, the LED groups have equal numbers of LEDs, and the power switches operate in a symmetrical manner to one another such that all the LED groups have the same average light output. This allows the LEDs to be placed in different positions in a luminaire without any observable brightness change from LED to LED. The number of LED groups can be from two to sixteen, with four, five, six being preferred numbers that offer a balance between simplicity and efficiency.

Figure 16:
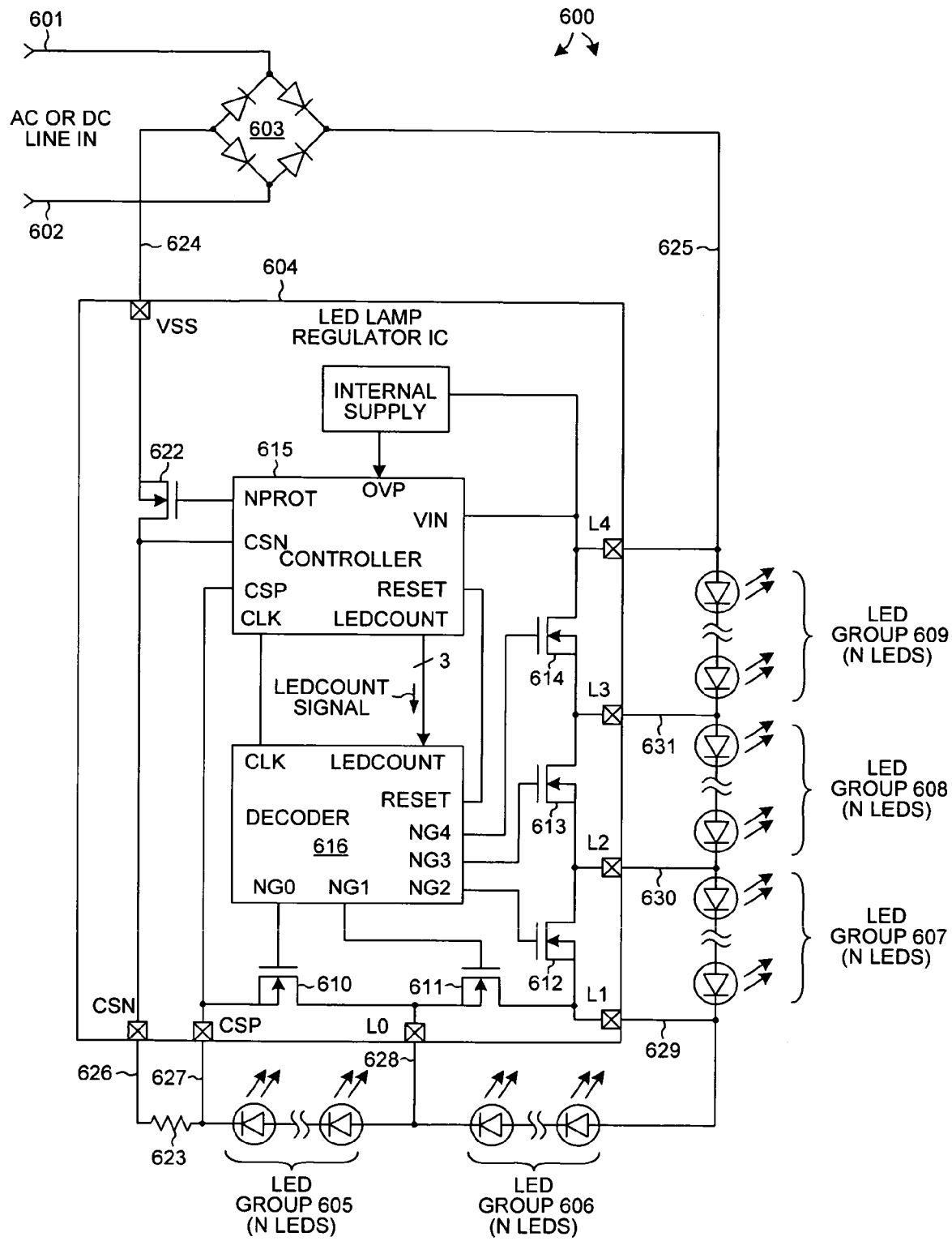
FIG. 16 is a diagram of a third embodiment of an AC LED lamp.

FIG. 16 is a diagram of a third embodiment. AC LED lamp 600 includes power input terminals 601 and 602, a rectifier 603, an integrated circuit 604, and five groups of LEDs 605-609. Within integrated circuit 604 there are five power switches 610-614 for controlling the five corresponding groups of LEDs 605-609. Each group of LEDs has the same N number of LEDs, where N is an integer. In this embodiment, controller 615 operates in a similar way as controller 92 of FIG. 5. Decoder 616, on the other hand, also handles evening out power dissipation between all the groups of LEDs.

Figures 17, 18:
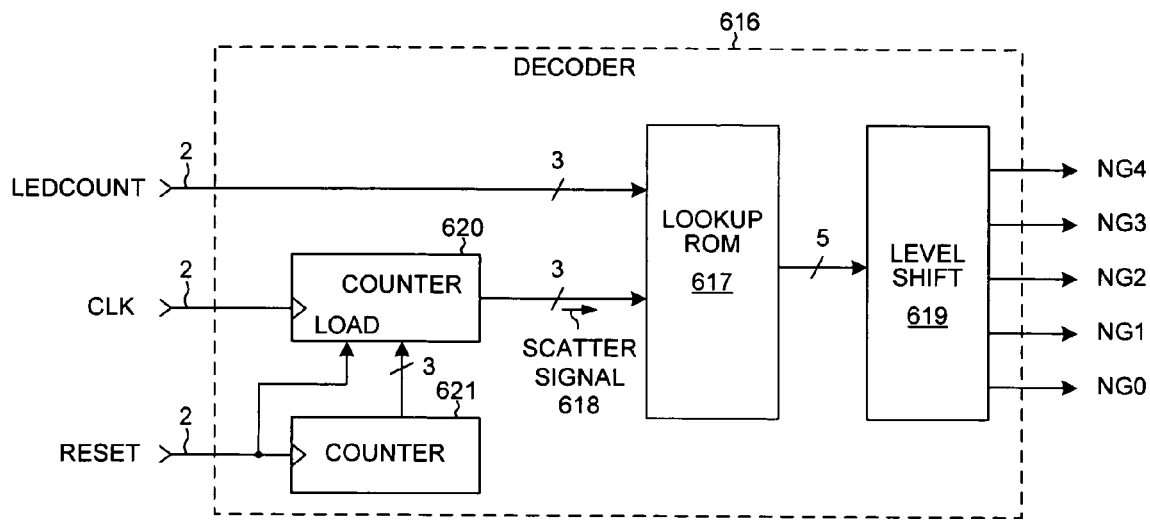
FIG. 17 is a circuit diagram of the decoder 616 of the third embodiment of FIG. 16.
FIG. 18 is a table that illustrates operation of the lookup ROM 617 of FIG. 17.

FIG. 17 is a more detailed diagram of decoder 616 of FIG. 16. A lookup Read-Only Memory (ROM) circuit 617 receives the three-bit LEDCOUNT value as well as a three-bit SCATTER signal 618 as inputs. From these six bits the lookup ROM circuit 617 outputs a five-bit code NG0-NG4 that is level-shifted by a level shift circuit 619. As directed by the five-bit code, level shift circuit 619 drives the power switches 605-609. The SCATTER signal 618 is generated by counter 620 that is clocked by a CLK signal. Counter 620 is loaded with the state of a second counter 621 by the signal RESET at the beginning of each line in voltage half cycle. Both counters 620 and 621 are cycled back to zero after reaching a value of four. Counter 621 is also clocked by the signal RESET. As a result, SCATTER signal 618 has a three-bit value that ranges from zero and four, and this value increments after each short CLK period and has a different starting value for each of five sequential line in voltage half-cycles.

FIG. 18 is a table that illustrates the operation of lookup ROM 617. For each incoming LEDCOUNT value, the decoder 616 controls the correct number of LEDs to be active, but the actual determination of which particular group of LEDs will be made active varies for each CLK period. Accordingly, over multiple cycles of the signal CLK the average duty cycle that each group of LEDs is on is the same. To ensure maximum matching of this LED on duty cycle, counter 621 provides a different starting count for each of five sequential line in voltage half-cycles, such that over five sequential line in voltage half-cycles any small mismatch in duty cycle between different groups of LEDs is eliminated. Also, for best matching effect, the LED current limit VILIM is set such that the LEDs operate at essentially a constant current level at any instantaneous rectified line voltage higher than (N·VF). In this operational mode, protection switch 622 operates as a constant current source in normal operation and controller 615 detects the voltage across protection switch 622 for up/down counting. For anti-flicker, protection switch 622 is turned off at the peak of the instantaneous rectified line voltage to double the effective operating frequency of the LED string.

Figure 19:
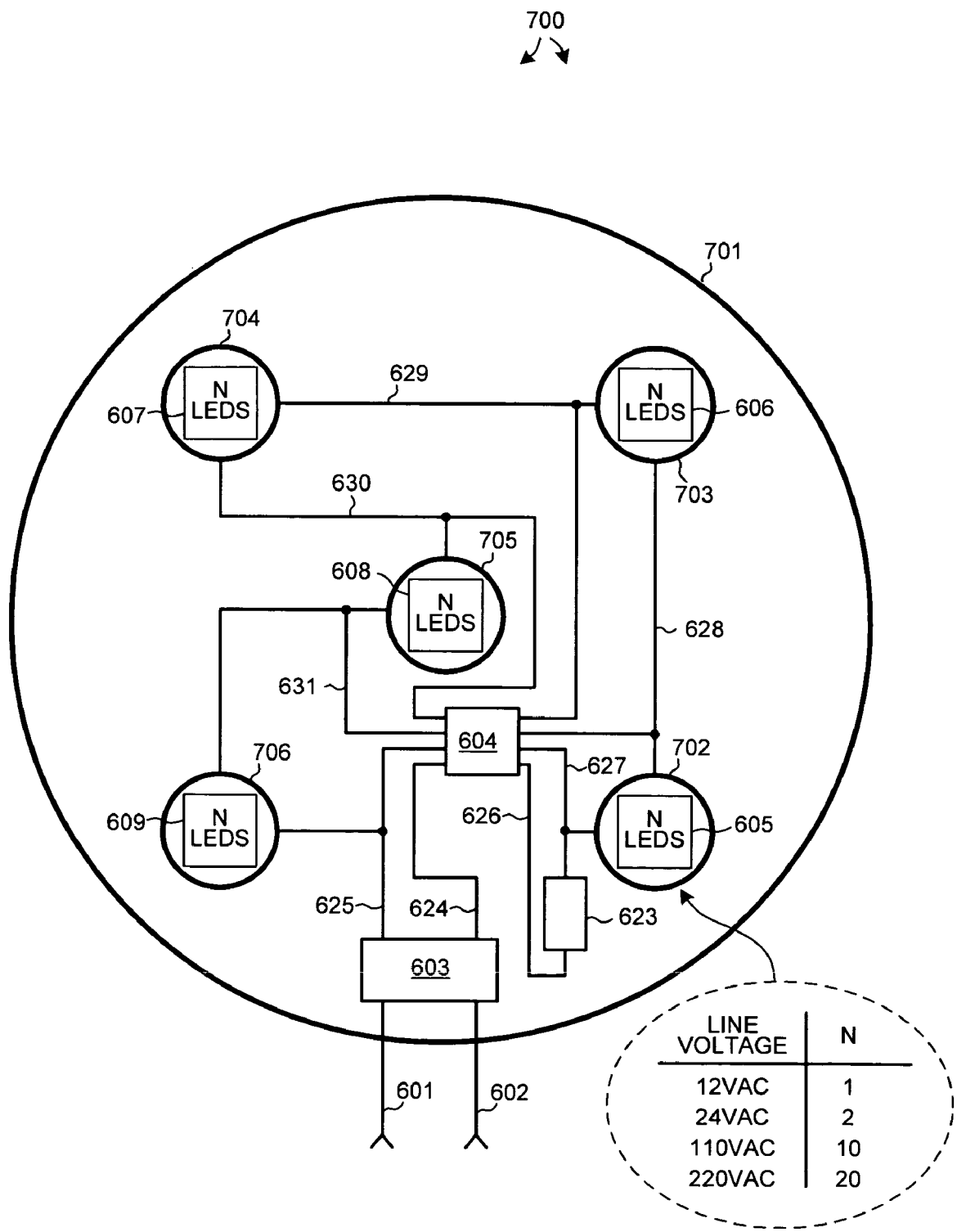
FIG. 19 is a diagram of an AC LED lamp structure 700 that utilizes the circuitry of FIGS. 16-18.

FIG. 19 is a diagram of an AC LED lamp 700. Lamp 700 includes the integrated circuit 604 of FIG. 16. In this lamp, five groups of LEDs are used. Each group has the same number of LEDs. For a 110 VAC line in application, each group of LEDs has approximately ten LED dice coupled together in series (N=10). For a 220 VAC line in application, each group of LEDs has approximately twenty LED dice in series (N=20). For a 12 VAC line in application with five watts of LED power, each group of LEDs has a single one watt LED. For a 24 VAC line in application with five watts of LED power, each group of LEDs has two LED dice coupled in series for a total of one watt. Integrated circuit 604, current sense resistor 623, and rectifier 603 are also installed in the lamp 700. Integrated circuit 604 may be a packaged integrated circuit, a chip-scale micro-bumped silicon die, or a silicon die wire-bonded to the printed circuit board 701. Circle symbols 702-706 represent lenses. Conductors 624-631 in FIG. 16 are identified with like reference numerals in FIG. 19.

Figure 20:
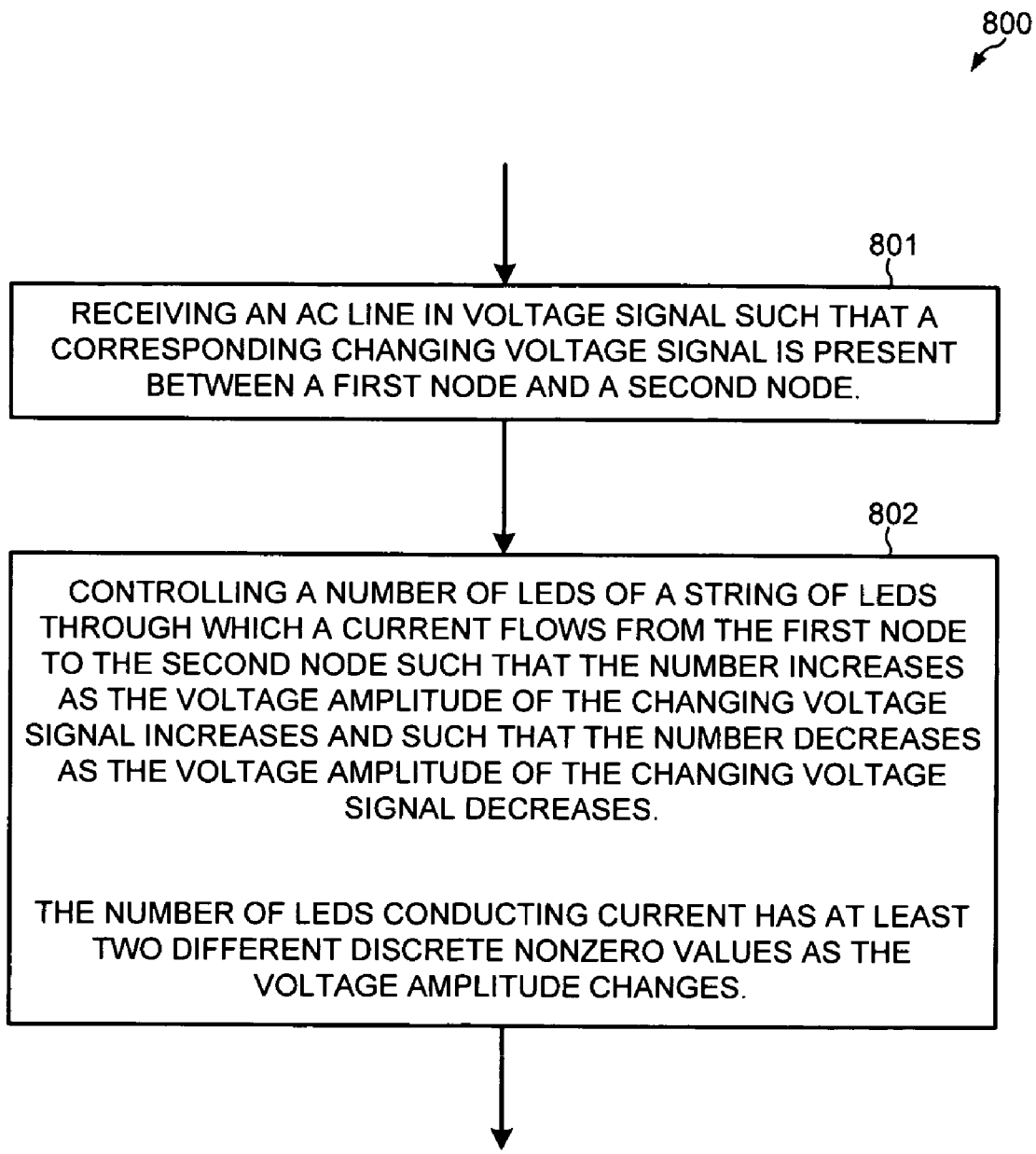
FIG. 20 is a simplified flowchart of a novel method 800.

FIG. 20 is a flowchart of a novel method 800. In a first step (step 801), an AC line in voltage signal is received such that a changing voltage signal is present between a first node and a second node. In one example of method 800, the AC line in voltage signal is a 110 VAC 60 Hz signal received onto terminals 53 and 54 of the AC LED lamp 50 of FIGS. 3 and 4. A corresponding changing voltage signal (for example, a full-wave rectified version of the AC line in signal) is present between the first end 55 of the LED string and the second end 56 of the LED string.

In a second step (step 802), the number of LEDs of the LED string through which current is allowed to flow (from the first node to the second node) is controlled such that the number increases as the voltage amplitude of the changing voltage signal increases and such that the number decreases as the voltage amplitude of the changing voltage signal decreases. The number has many (for example, at least two) different discrete values as the voltage amplitude changes. In one example, the changing voltage signal is represented by the upper waveform labeled "RECTIFIED INPUT (V)" in FIG. 6. The number of LEDs through which current is allowed to flow increases and decreases as indicated in the waveform labeled "ACTIVE LED COUNT" in FIG. 6.

In the first embodiment of FIGS. 3 and 4, the power switches are sized to optimize the die area. In a typical fabrication process, the specific resistance of a MOSFET is approximately inversely proportional to the breakdown voltage. For a given die area, the resistance of a power switch when it is on increases approximately proportionally to its rated breakdown voltage when it is off. Therefore, it is optimal to allow for higher on-resistance for the power switch driving more LEDs because the power switch needs to have a higher breakdown voltage than the total LED forward voltage drop in the group of LEDs being switched. Protection switch 89 needs to be able to sustain the peak rectified voltage. In the first embodiment of FIGS. 3 and 4 for a five watt 110 VAC application, the protection switch 89 can have a resistance of 48 ohms and can be rated for 200 volts, the power switches 88 and 87 can have resistance of 48 ohms and can be rated for 80 volts, the power switch 86 can have a resistance of 24 ohms and can be rated for 40 volts, the power switch 85 can have a resistance of 12 ohms and can be rated for 20 volts, the power switch 84 can have a resistance of 6 ohms and can be rated for 10 volts, and the power switch 83 can have a resistance of 3 ohms and can be rated for 5 volts. In the first embodiment of FIGS. 3 and 4 for a five watt 220 VAC application, the protection switch 89 can have a resistance of 96 ohms and can be rated for 400V, the power switches 88 and 87 can have resistances of 96 ohms and can be rated for 160 volts, the power switch 86 can have a resistance of 48 ohms and can be rated for 80 volts, the power switch 85 can have a resistance of 24 ohms and can be rated for 40 volts, the power switch 84 can have a resistance of 12 ohms and can be rated for 20 volts, and the power switch 83 can have a resistance of 6 ohms and can be rated for 10 volts.

In the third embodiment of FIG. 16, the power switches are all of equal sizes. For a five watt 12 VAC application, the power switches can have resistances of approximately one half ohm when on and can be rated for five volts each. For a five watt 24 VAC application, the power switches can have resistances of approximately one ohm when on and can be rated for ten volts each. For a five watt 110 VAC application, the power switches can have resistances of approximately five ohms when on and can be rated for fifty volts each. For a five watt 220 VAC application, the power switches can have resistances of approximately ten ohms when on and can be rated for one hundred volts each.

The embodiments described above are advantageous in that only a relatively small number of components are needed to create a solid-state AC LED lamp. As a result, the AC LED lamp has superior reliability and a long mean time to failure. Moreover, the AC LED lamps in the first embodiment and the third embodiment need involve no electrolytic capacitor that may degrade reliability. By achieving high efficiency, less energy is wasted. Electromagnetic Interference (EMI) issues are minimized as compared to many AC-to-DC converter LED lamps because the AC LED lamp embodiments described above involve no high frequency power switching.

Rather than using a control circuit of application specific circuitry to control the power switches, the control functions in another embodiment are performed by a flexible and programmable microcontroller that controls the power switches. The power switches, current sense resistor, and protection switch may be realized on the same integrated circuit along with the remainder of the microcontroller. Alternatively, the power switches, current sense resistor, and protection switch may be provided external to the microcontroller integrated circuit. The microcontroller has a zero-crossing detecting comparator that is used to detect the time of zero phase of the rectified line in voltage signal. The microcontroller also has an analog-to-digital converter and an associated input multiplexer that is used to detect the magnitude of the voltage drop across the LED string and to detect the magnitude of a voltage drop across a current sense resistor. Timers of the microcontroller are used to time the occurrences of detected events and conditions and are also used to time and control certain outputs of the microcontroller. Input/output (I/O) terminals of the microcontroller are used to drive and control the gates of the power switches in the event the switches are external, or are coupled to the interconnection nodes of the LED string in the event the power switches are internal. The microcontroller may be provided with special gate drive circuitry for driving the gates of external power MOSFETs. The microcontroller is programmed to use these input circuits and output circuits and other resources to perform the functions described above in connection with integrated circuit 52 of FIG. 4.

Although certain specific embodiments are described above for instructional purposes, the teachings of this patent document have general applicability and are not limited to the specific embodiments described above. The number of LEDs in the groups of LEDs can differ from the numbers set forth in the illustrated examples. Each LED can be created by combining any number of LEDs in parallel and in the same orientation, and any reference to one LED also refers to any such combination of parallel LEDs. For each LED group or section, the number of LEDs in series is used to denote any manner of parallel and series network of LEDs that results in an equivalent total forward voltage drop when a current is applied. In addition, the order of connection of the different groups of LED in the overall LED string can be of a different order. The LED string may comprise sections that are not directly connected. The LED string may comprise devices that are not LEDs. The sense resistor may be either internal or external to the integrated circuit. The power switches can be either N-channel field effect transistors (NFETs), P-channel field effect transistors (PFETs), or another suitable type of switch. Additional external components such as capacitors, transient suppressors, current-limiting resistors, and fuses may be added to improve performance. The rectifier diode bridge may be incorporated into the integrated circuit in some examples, and may be replaced with active MOSFETs to reduce voltage drop especially for low voltage applications such as for 12 VAC and 24 VAC line in applications. Accordingly, various modifications, adaptations, and combinations of various features of the described embodiments can be practiced without departing from the scope of the invention as set forth in the claims.

What is claimed is:

1. An integrated circuit comprising: a first terminal; a second terminal; a power switch coupled to selectively couple the first and second terminal; a control circuit adapted to control the power switch based at least in part on an electrical characteristic of a string of Light Emitting Diodes (LEDs) external to the integrated circuit and an input voltage, wherein during a first time a current flows through the power switch, wherein during a second time the current does not flow through the power switch, and wherein the input voltage during the second time is higher than the input voltage during the first time; and a protection switch, wherein the string of LEDs has a first end node and a second end node, wherein an AC voltage signal having a waveform substantially identical to a waveform of a rectified AC sine wave is present across the string of LEDs between the first and second end nodes, wherein the protection switch is coupled to the second end node, wherein the string of LEDs consumed power, and wherein when an LED string current flows through all of the LEDs of the string of LEDs the protection switch limits the LED string current so as to reduce a power consumed by the string of LEDs while an AC voltage signal is at a maximum.

2. The integrated circuit of claim 1, wherein the string of LEDs has a first end and a second end, wherein the input voltage is a rectified version of an AC line in voltage signal and is present between the first and second ends of the string of LEDs, wherein the electrical characteristic of the string of LEDs is an LED string current, and wherein during both the first time and the second time current flows through at least a part of the string of LEDs.

3. An integrated circuit comprising:
   a first terminal;
   a second terminal;
   a third terminal;
   a first power switch coupled to selectively couple the first and second terminal;
   a second power switch coupled to selectively couple the second and third terminal;

a current sense resistor; and a control circuit adapted to control the first and second switches based at least in part on the electrical characteristic of a string of Light Emitting Diodes (LEDs) external to the integrated circuit, wherein during a first time a current flows out of the first terminal and onto a first interconnection node on the string of LEDs, wherein during a second time a current flows out of the second terminal and onto a second interconnection node on the string of LEDs, wherein during a third time a current flows out of the third terminal and onto a third interconnection node on the string of LEDs, wherein the control circuit is adapted to control the first and second switches in a condition in which a first number N of LEDs is coupled in series between the current sense resistor and the first interconnection node, in which a second number 2N of LEDs is coupled in series between the first interconnection node and the second interconnection node, in which a third number 4N of LEDs is coupled in series between the second interconnection node and the third interconnection node, and in which a fourth number 8N of LEDs is coupled to the third interconnection node opposite the third number 4N of LEDs, and wherein N is a positive nonzero integer.

4. The integrated circuit of claim 3, wherein the electrical characteristic is a current flowing out of the string of LEDs.

5. The integrated circuit of claim 3, wherein the electrical characteristic is a voltage present across at least a portion of the string of LEDs.

6. The integrated circuit of claim 3, wherein the string of LEDs has a first end node and a second end node, and wherein an AC voltage signal having a waveform substantially identical to a waveform of a rectified AC sine wave is present across the string of LEDs between the first and second end nodes.

7. The integrated circuit of claim 3, wherein the control circuit senses a current flowing through the string of LEDs, and wherein the control circuit controls the first and second switches such that the current remains less than a predetermined value.

8. The integrated circuit of claim 3, wherein during a fourth time a current flows in a current path through the second switch, and then through the first switch, then out of the integrated circuit through the first terminal and onto the first interconnection node on the string of LEDs.

9. The integrated circuit of claim 3, wherein an increasing input voltage signal is present across the string of LEDs, and wherein the control circuit controls the first and second switches such that current flows only through a number of LEDs of the string of LEDs, wherein this number increases from a first nonzero value to a second nonzero value as the voltage of the input voltage signal increases.

10. The integrated circuit of claim 3, wherein the control circuit maintains a multi-bit digital value, and wherein the multi-bit digital value is indicative of a voltage across the string of LEDs.

11. The integrated circuit of claim 3, wherein the control circuit maintains a multi-bit digital value indicative of a voltage across the string of LEDs, wherein the string of LEDs has a power factor, and wherein the control circuit performs power factor-correction of the power factor of the string of LEDs by controlling an average current flow flowing through the string based at least in part on the multi-bit digital value.

12. The integrated circuit of claim 3, wherein an AC voltage signal is present across the string of LEDs, wherein the string of LEDs consumes an average power, and wherein the control circuit performs average LED string power regulation by controlling an average current flow flowing through the string of LEDs such that an average LED string power is controlled to be substantially constant despite changes in a voltage amplitude of the AC voltage signal across the string of LEDs.

13. The integrated circuit of claim 3, further comprising:
a protection transistor, wherein all current flowing through the string of LEDs passes through the protection transistor, and wherein the control circuit under a predetermined condition limits current flow through the string of LEDs to a current limit value by controlling a gate voltage on a gate of the protection transistor.

14. The integrated circuit of claim 3, wherein the control circuit includes:
a current sense circuit adapted to sense a current flowing through the string of LEDs; and
a counter that changes count in response to the current sense circuit detecting that the current flowing through the string of LEDs has passed a threshold current.

15. The integrated circuit of claim 14, wherein the counter of the control circuit outputs a multi-bit digital value, and wherein the multi-bit digital value is used to control the first and second switches.

16. The integrated circuit of claim 3, wherein the control circuit is adapted to control the first and second switches in a condition in which a first number of LEDs is coupled in series between the first and second terminals, and in which a second number of LEDs is coupled in series between the second and third terminals, and wherein the first and second numbers are different nonzero numbers.

17. The integrated circuit of claim 16, wherein the second number is twice as large as the first number.

18. The integrated circuit of claim 3, further comprising:
a protection switch, wherein a rectified AC voltage is present across the string of LEDs, wherein the protection switch is coupled to the current sense resistor, wherein the string of LEDs consumes power, and wherein when an LED string current flows through all of the LEDs of the string of LEDs the protection switch limits the LED string current so as to reduce a power consumed by the string of LEDs while a rectified AC voltage is at a maximum.

19. A system comprising:
a string of series-connected Light Emitting Diodes (LEDs);
an integrated circuit comprising:
a first terminal coupled to .a first node on the string of LEDs;
a second terminal coupled to a second node on the string of LEDs;
a third terminal coupled to a third node on the string of LEDs;
a first power switch coupled to selectively couple the first and second terminals;
a second power switch coupled to selectively couple the second and third terminals;
a protection switch; and
a control circuit that controls the first and second power switches;
a first input power node; and
a second input power node, wherein a current flows from the first input power node, through an amount of the string of LEDs as controlled by the integrated circuit, through the protection switch, and to the second input power node, wherein a rectified AC voltage is present across the string of LEDs, wherein the string of LEDs consumes power, and wherein when the current flows through all of the LEDs of the string of LEDs the protection switch limits the current so as to reduce a power consumed by the string of LEDs while the rectified AC voltage is at a maximum.

20. The system of claim 19, wherein the amount of the string of LEDs through which the current flows is changed as the magnitude of the rectified AC voltage changes.

21. The system of claim 19, wherein the control circuit of the integrated circuit senses the current flowing through the string of LEDs.

22. The system of claim 19, wherein the control circuit of the integrated circuit adjusts current flow through the string of LEDs with respect to the rectified AC voltage to achieve power factor correction and a power factor of approximately one.

23. The system of claim 19, wherein the string of LEDs consumes an average power, wherein the control circuit maintains information indicative of an amplitude of the rectified AC voltage, and wherein the control circuit of the integrated circuit performs average LED string power regulation by controlling an average current flow flowing through the string of LEDs based at least in part on the information maintained by the control circuit.

24. The integrated circuit of claim 19, further comprising:
a valley fill capacitor coupled to the first input power node, wherein no LEDs are coupled between the valley fill capacitor and the first input power node, wherein a number of series-connected LEDs are coupled between the valley fill capacitor and the third node, and wherein the valley fill capacitor supplies a voltage to a number of series-connected LEDs while the rectified AC voltage is at a minimum.

25. A method comprising:
controlling a number of Light Emitting Diodes (LEDs) of a string of series-connected LEDs through which a current flows from a first node to a second node, wherein a changing voltage signal is present between the first node and the second node, wherein the number increases as a voltage amplitude of the changing voltage signal increases, wherein the number decreases as the voltage amplitude of the changing voltage signal decreases, and wherein the number is made to have at least two discrete different nonzero values as the voltage amplitude of the changing voltage signal changes; and
limiting the current flowing through the string of LEDs using a protection transistor, wherein the protection transistor is disposed in series with the string of LEDs, wherein the string of LEDs consumes power, and wherein when the current flows through all of the LEDs of the string of LEDs the protection transistor limits the current so as to reduce the power consumed by the string of LEDs while the voltage amplitude is at a maximum.

26. The method of claim 25, wherein the number is controlled by an integrated circuit adapted to be coupled to the string of LEDs.

27. The method of claim 26, wherein the number of LEDs through which the current flows on its way from the first node to the second node is controlled by using power switches to short out selected portions of the string of LEDs, and wherein the power switches are parts of the integrated circuit.

28. The method of claim 25, wherein the changing voltage signal is a full-wave rectified sinusoidal AC signal.

29. The method of claim 25, further comprising:
sensing the current and controlling the number of LEDs through which the current flows based at least in part on said sensing.

30. The method of claim 25, further comprising:
sensing the current using a current sense resistor, wherein the current sense resistor is disposed in series with the string of LEDs between the first node and the second node.

31. The method of claim 25,
wherein the current flowing through the string of LEDs is limited by adjusting a gate voltage on a gate of the protection transistor.

32. The method of claim 25, further comprising:
discontinuing current flow through the string of LEDs by turning off the protection transistor when one of an over-voltage condition and an over-temperature condition is detected.

* * * * *